Figure 2:
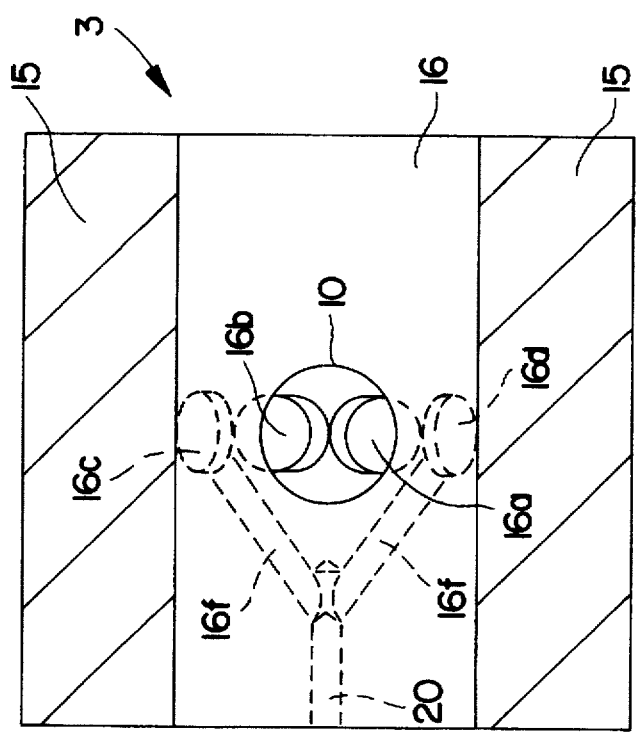

United States Patent [19]

Schwanekamp et al.

[11] Patent Number: 5,779,898
[45] Date of Patent: Jul. 14, 1998

[54] CONTROL DEVICE FOR FILTERS IN AT LEAST TWO PARTIAL FLUID STREAMS

[75] Inventors: Heinrich Schwanekamp, Vreden; Ludger Wilken-Trenkamp, Havixbeck; Manfred Hangmann, Greven; Wilfred Leuders, Gronau, all of Germany

[73] Assignee: WilMan Polymer Filtration GmbH, Wettringen, Germany

[21] Appl. No.: 800,212

[22] Filed: Feb. 12, 1997

Related U.S. Application Data

[63] Continuation of Ser. No. 404,629, Mar. 14, 1995, abandoned.

[30] Foreign Application Priority Data

Mar. 15, 1994 [DE] Germany .................. 44 08 803.5
Mar. 15, 1994 [DE] Germany .................. 44 08 600.8

[51] Int. Cl.$^6$ .................................................. B01D 35/12
[52] U.S. Cl. .................. 210/324; 55/350.1; 210/333.01; 210/341; 210/426; 425/199
[58] Field of Search .................. 210/324, 330, 210/332, 333.01, 333.1, 340, 341, 424–428; 425/197, 199; 55/302, 350.1

[56] References Cited

U.S. PATENT DOCUMENTS

| | | | |
|---|---|---|---|
| 236,496 | 1/1881 | Howes | 210/340 |
| 276,820 | 5/1883 | Howes | 210/333.1 |
| 481,109 | 8/1892 | Edmiston | 210/333.1 |
| 3,503,096 | 3/1970 | Marianelli | 210/341 |
| 3,896,029 | 7/1975 | Beuselinck | 210/341 |
| 4,504,390 | 3/1985 | Steffen | 210/341 |
| 4,973,406 | 11/1990 | Ponzielli | 210/340 |
| 5,004,414 | 4/1991 | Stude et al. | 425/199 |
| 5,125,823 | 6/1992 | Kreyenborg | 210/333.01 |
| 5,308,484 | 5/1994 | Bacher et al. | 210/333.01 |
| 5,407,586 | 4/1995 | Gneuss | 425/199 |

FOREIGN PATENT DOCUMENTS

| | | |
|---|---|---|
| 0 250 695 A1 | 7/1988 | European Pat. Off. . |
| 35 27 173 C1 | 9/1986 | Germany . |
| 39 05 963 A1 | 9/1989 | Germany . |
| 40 12 404 C1 | 2/1991 | Germany . |
| 42 18 756 C1 | 4/1993 | Germany . |

*Primary Examiner*—Joseph W. Drodge
*Attorney, Agent, or Firm*—Meltzer, Lippe, Goldstein et al.

[57] ABSTRACT

A control device for at least two partial fluid ducts comprises a common fluid supply duct and a common fluid removal duct. The fluid supply duct is connected with the fluid removal duct by at least two partial fluid ducts. A filtering device, a valve device each having a blocking element, and a stop valve are each located in a corresponding partial fluid duct. Each blocking element of the valve device operates in such a way that the blocking element can be moved between a first (open) position, in which the fluid flowing through the partial fluid duct in which it is located is filtered, and a second (closed) position, in which the fluid is filtered in the other partial fluid duct, whereas at the same time the filtering device provided in the partial fluid duct in which it is located is washed by the fluid flowing in the reverse direction. Furthermore, each blocking element can be brought from the first position into the second position and vice-versa by rotating the blocking element.

29 Claims, 18 Drawing Sheets

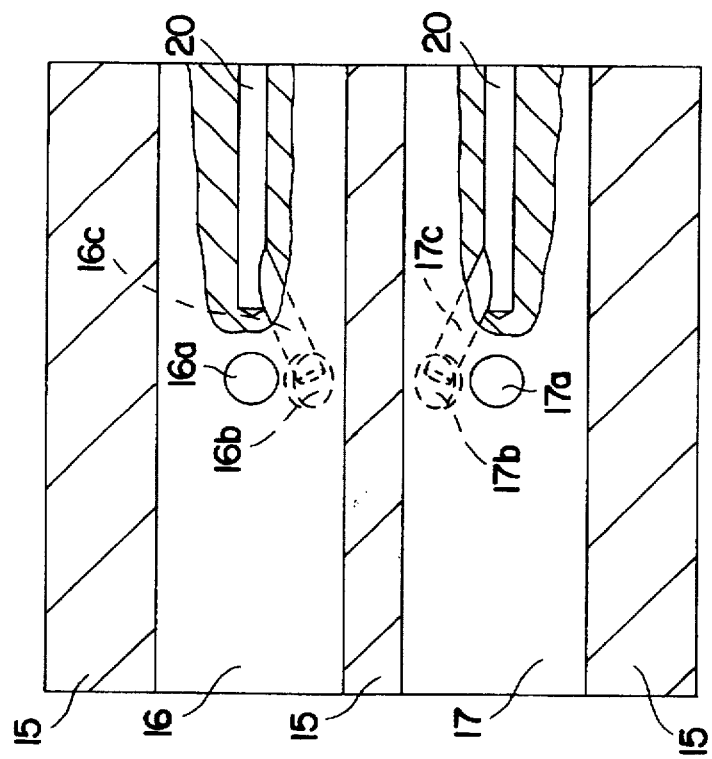
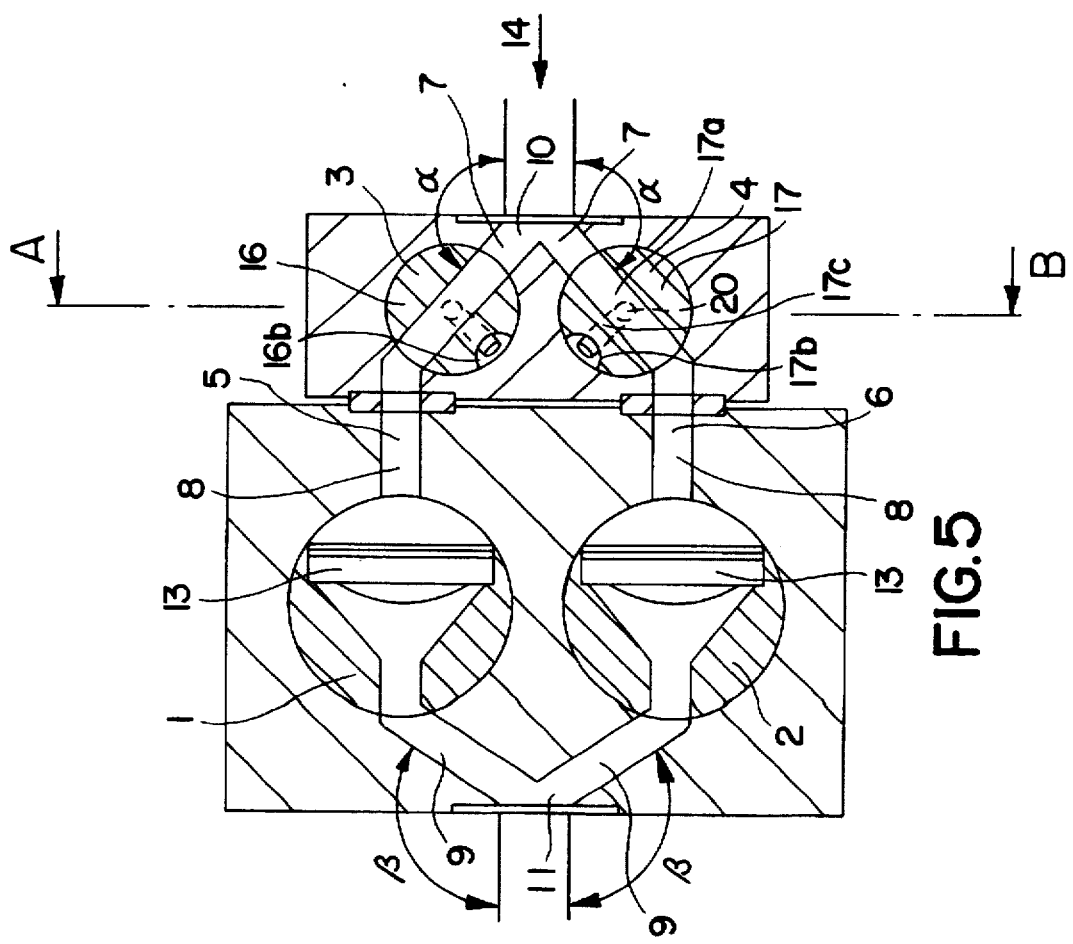

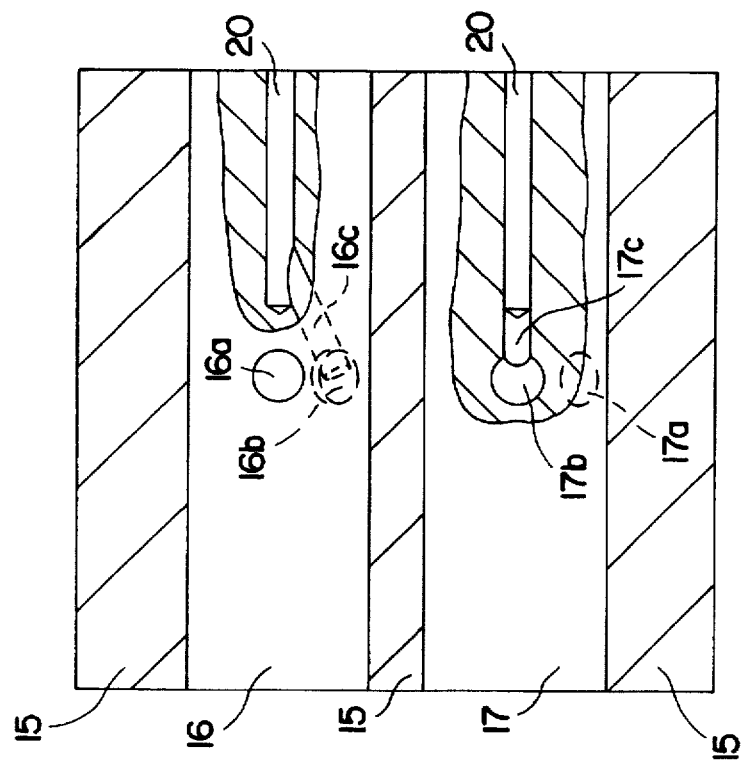
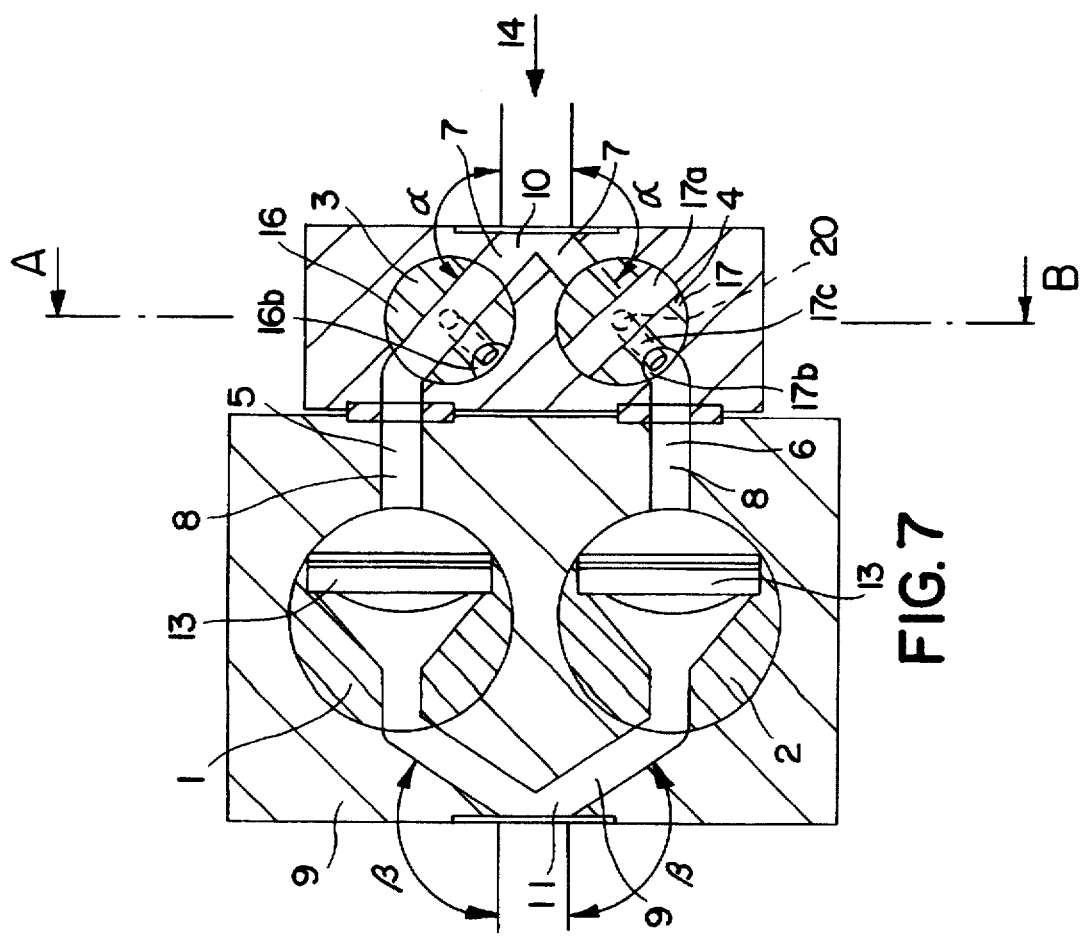
FIG. 8
FIG. 7

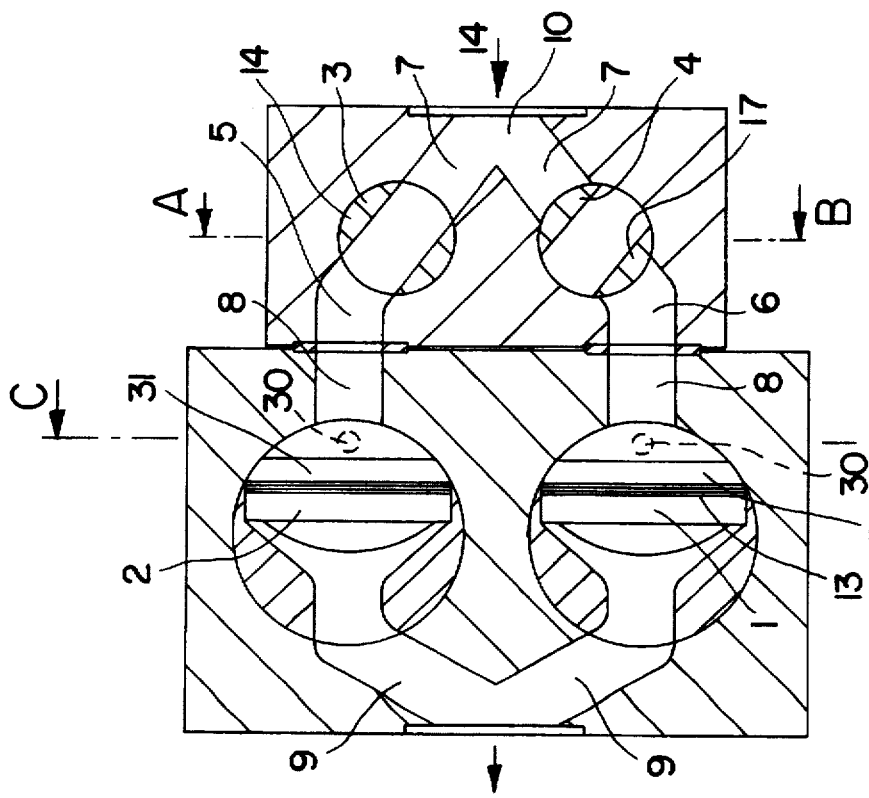
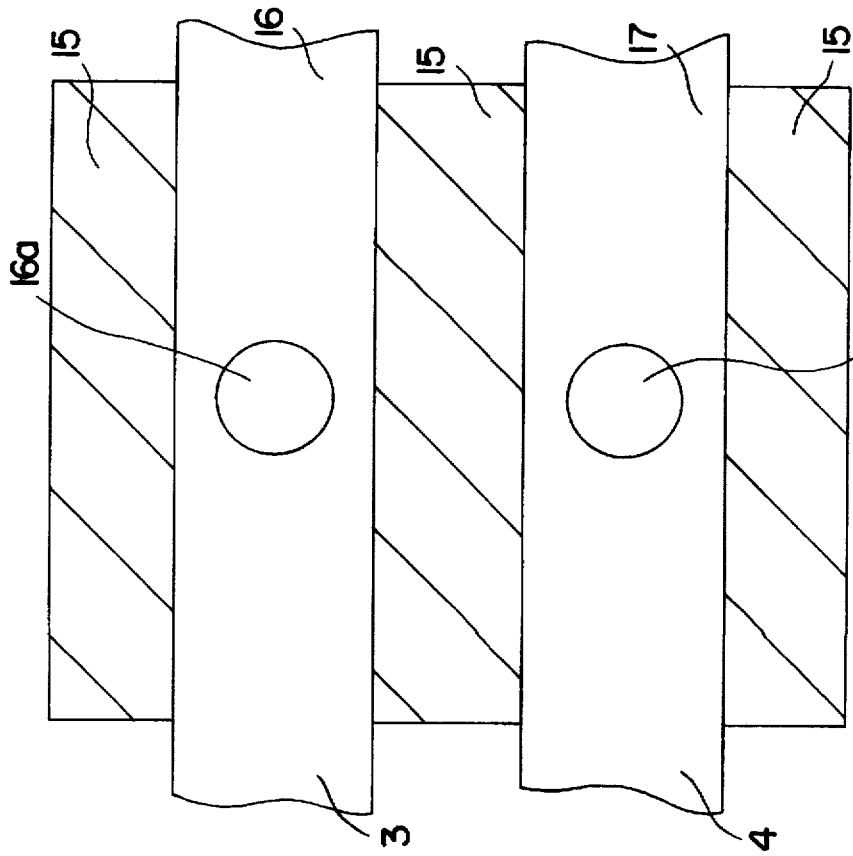

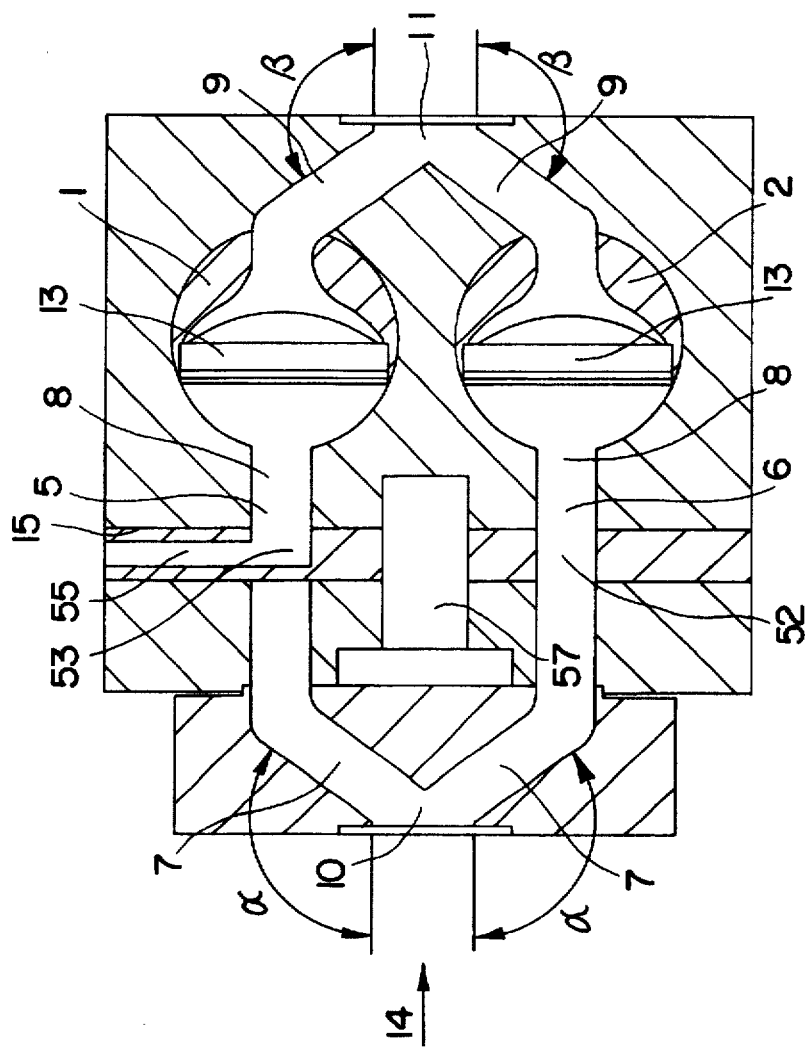
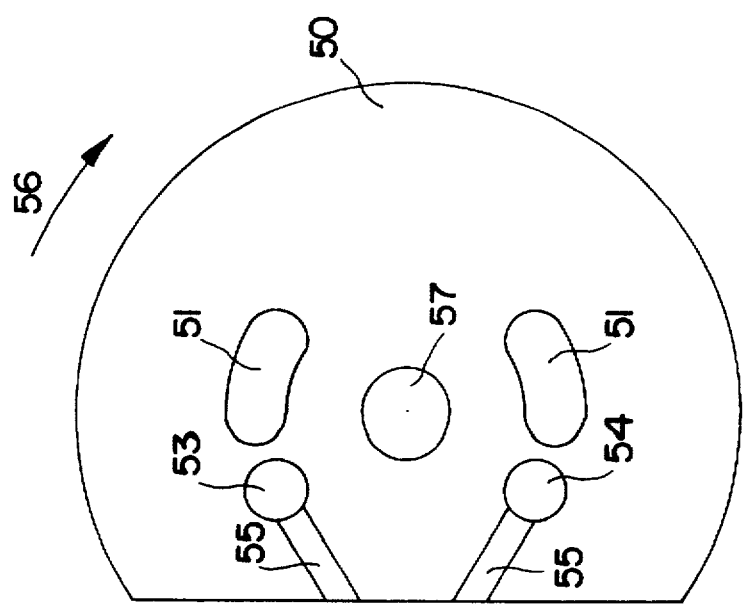

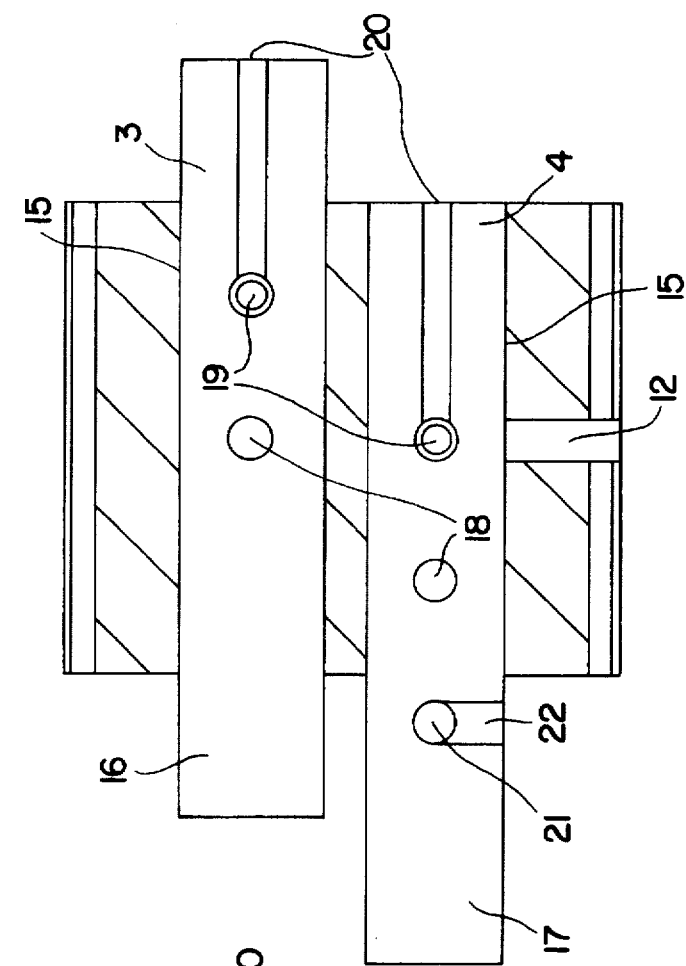
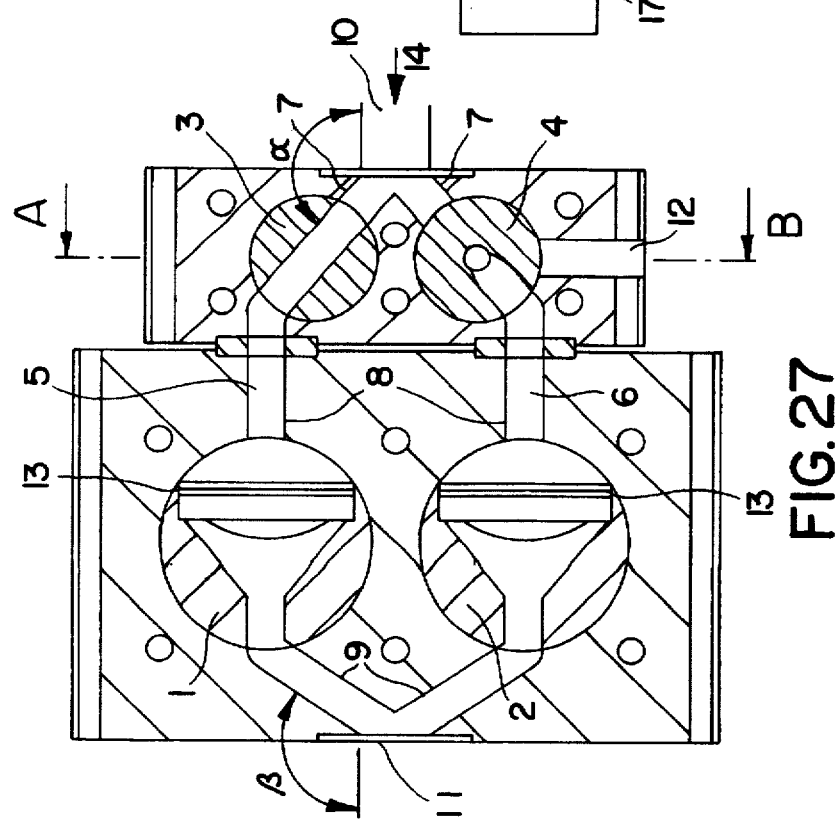
FIG. 28
FIG. 27

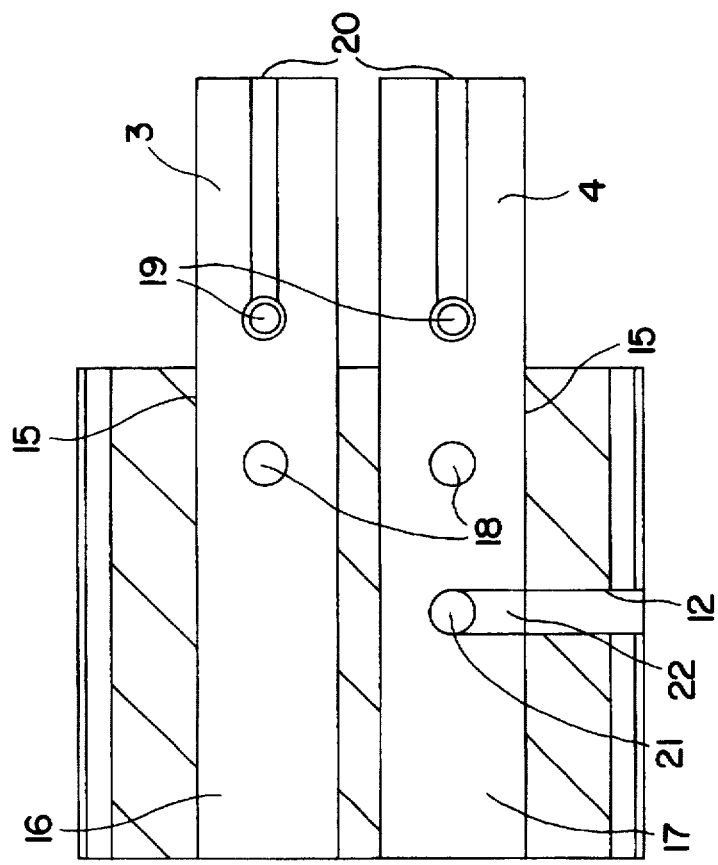
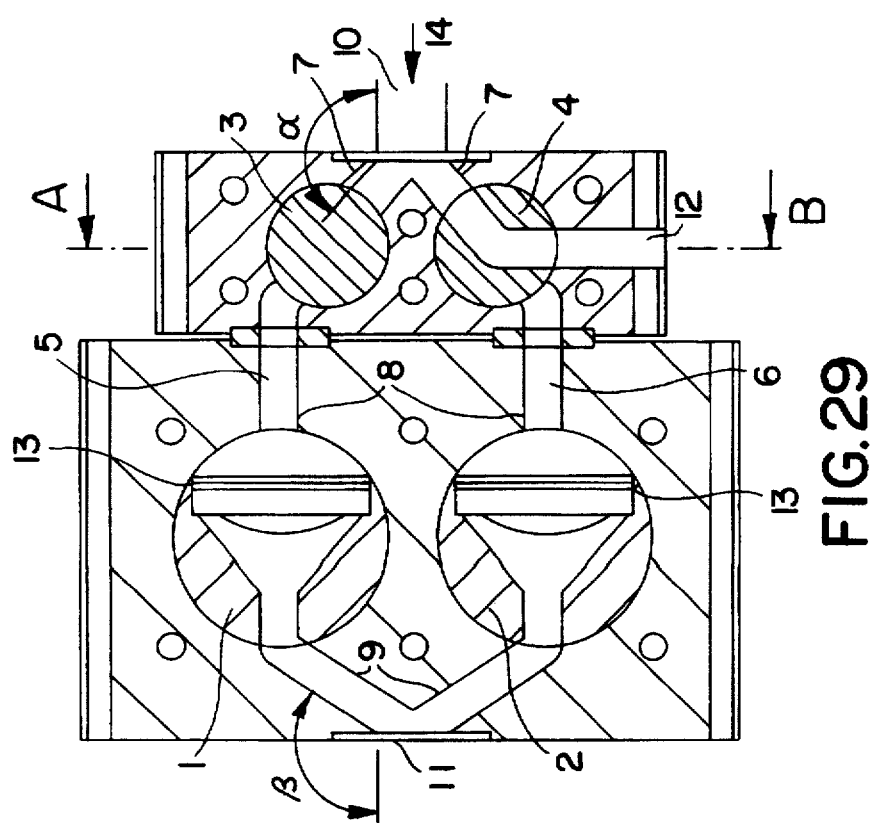
FIG.30
FIG.29

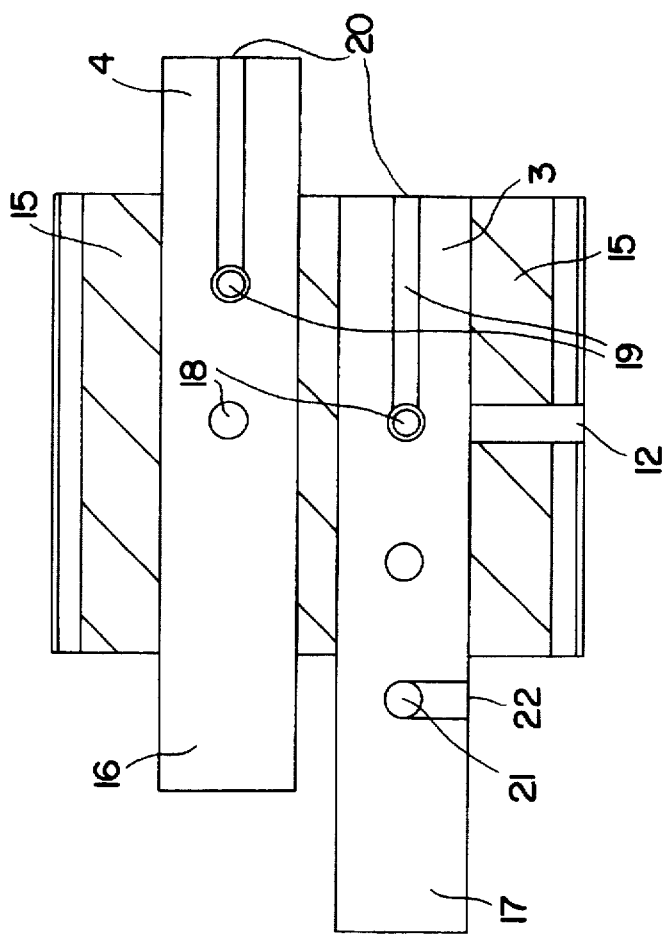
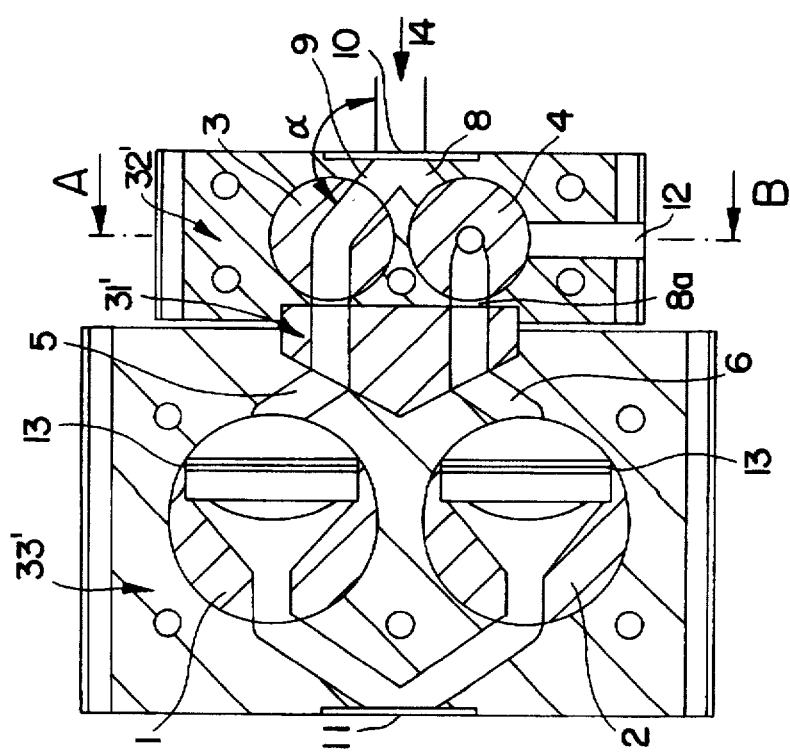
FIG. 34
FIG. 33

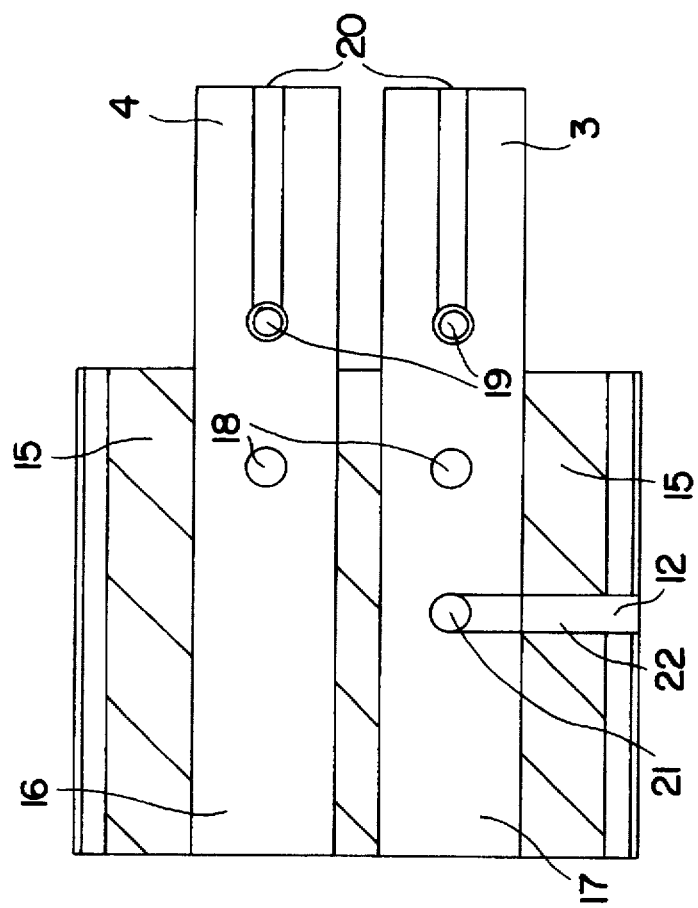
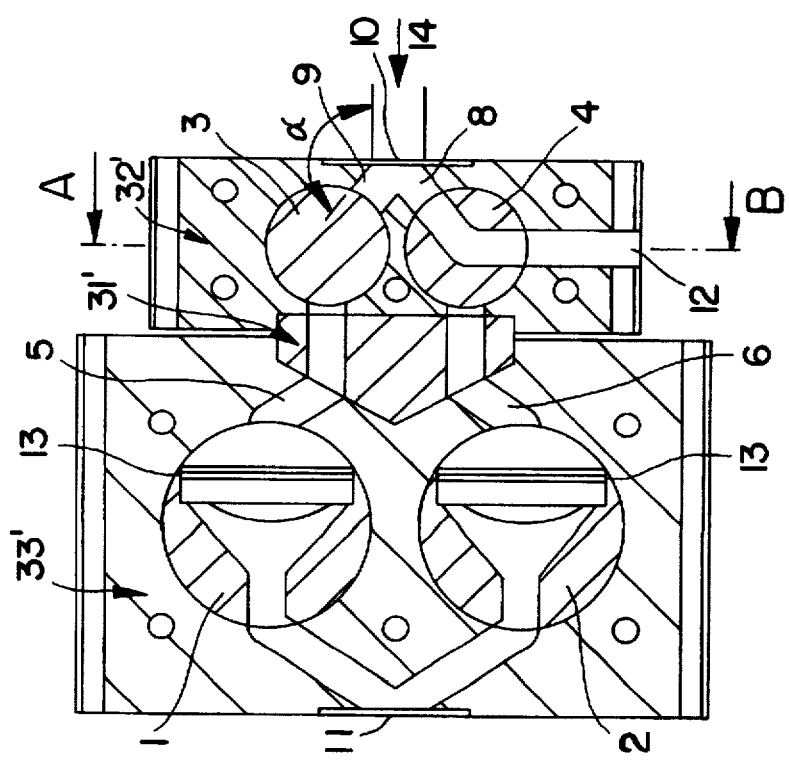

CONTROL DEVICE FOR FILTERS IN AT LEAST TWO PARTIAL FLUID STREAMS

This is a continuation of application Ser. No. 08/404,629, filed Mar. 14, 1995, now abandoned.

The present invention relates to a control device for at least two partial fluid streams with the characteristics of the generic part of claim 1.

It is a frequently met technological problem, that fluid streams must be filtered. It is a known solution for such a problem, to arrange a filtering device in a fluid duct, the fluid passing the filtering device in such a manner, that the unwanted particles which the fluid contains are filtered out. Furthermore there are such filtering devices, in which the main fluid stream, originating from a common fluid supply duct, is divided into several partial fluid ducts. Downstream from the partial fluid ducts, viewing in the flow direction of the fluid, the partial fluid ducts are again combined to a common fluid removal duct. In the partial fluid ducts of the filtering devices known for instance from EP-A 0 250 695, filters are arranged, whereby each filter can be perfused by both partial fluid streams at the same time or one filter is perfused by its respective partial fluid stream, whereas the other filter is washed in a reverse manner with the fluid and regenerated in that way. Furthermore, the filters are arranged in the known filtering device in respective filter-supporting bodies. Each filter-supporting body of the filtering devices known from EP-A 0 250 695 has the shape of a filter piston (pin) and is arranged in a housing of the filtering device in such a manner, that it can be shifted axially. In particular the filter can be converted from the filtering position into a washing or regenerating position by a shifting of the filter-supporting body. In this washing or regenerating position the respective filter is connected with a washing duct which is open to the atmosphere, with the consequence, that the particles filtered by the filter are removed out of the system.

The known, above-described filtering device shows a relatively complicated construction. This is due to the fact, that a large number of single ducts must be in alignment, since otherwise there is a risk, that dead zones are formed within the fluid streams, which might eventually lead to an obstruction of the known filtering device.

It is the aim of the present invention, to provide a control device of the indicated type for at least two partial fluid streams, which possesses a particularly simple construction.

This aim is achieved by a control device with the distinguishing features of the characterising part of claim 1.

The inventive control device for at least two partial fluid streams comprises a common fluid supply duct and a common fluid removal duct, said fluid supply duct being connected with the fluid removal duct through at least two partial fluid ducts. Each partial fluid duct is connected with a filtering device, whereby one or more filters of the filtering device is or are in contact with the fluid flowing through the respective partial fluid duct, in order to filter the unwanted particles from the fluid flowing through the partial fluid duct. Furthermore the inventive control device comprises at least one valve device, containing at least one blocking element (shut-off device). This blocking element of the valve device is allocated to at least one of the ducts (fluid supply duct, fluid removal duct, partial fluid duct) in such a manner, that the blocking element (shut-off device) can be moved from a first position, in which the fluid flowing in the ducts is filtered, into a second position, in which the fluid is filtered in the at least one partial fluid duct, whereas at the same time the filtering device or the respective filter or the respective filters connected with the at least one other partial duct is or are washed free from filtered particles. In order to enable the positioning to one of these two positions (first or second position), the respective blocking element of the inventive control device is arranged in such a manner, that it can be rotated and/or shifted, whereby it can be brought from the first position into the second position or from the second into the first position by turning and/or shifting.

A major advantage of the inventive control device is the fact, that it is possible to perfuse the filters of the respective filtering devices arranged in the at least two split fluid ducts and by so doing to separate the unwanted particles from the fluid, or to remove the separated particles from at least one filter or to filter at least one fluid stream and clean it from unwanted particles, whereas at the same time the other filter or the other filters is or are regenerated by the fluid.

The inventive control device provides a number of further advantages. It is one advantage, that the inventive control device possesses a particularly simple construction compared with the filtering device known from EP-A 0 250 695, since only a few ducts are required to enable the three operating modes described above. This is due to the fact, that the at least one valve device of the inventive control device is arranged on purpose separately from the filtering device, which is contrary to the arrangement in the above described control devices known in the art. By such a separate arrangement of filtering device and the at least one valve device it is further possible, to operate the inventive control device in a particularly trouble free way. It is a further advantage of the inventive control device, that, when the valve device wears out, it is only required to change this valve device and not the whole filtering device, which means the filter-supporting body included. Therefore, such reparations can be performed relatively cheaply and with little trouble. It is a significant advantage of the inventive control device, that it is very easy and simple, to wash and clean the control device when changing the colour or the composition of the filtered fluid, in particular when the control device is used in extruders for thermoplastic synthetic material. This not only leads to a reduction in production time, but in particular to a reduction in faulty productions or off-colours. Furthermore the inventive control device avoids the use of small-dimensioned ducts as much as possible, thereby avoiding the obstruction of such small ducts. This is particularly important, when the inventive control device is used for the filtration of relatively unstable synthetic materials with a high tendency of cracking.

In order to enable the operating modes described for the inventive control device, it is a first particularly simple embodiment of the inventive control device, that this embodiment comprises a single valve device. There are different possibilities for the arrangement of this single valve device, as is described hereafter.

It is a first possibility, that the single valve device comprises a single blocking element (shut-off device), which is allocated to the fluid supply duct in the zone of the division of the partial fluid streams. Thereby this blocking element has such a shape, that it can be moved, preferably by rotation and/or shifting, between the first position, in which the fluid flowing through the partial fluid ducts is filtered and the second position, in which the fluid is further filtered in at least one partial duct, whereas the filter or filters provided in the other partial duct or the other partial ducts is or are regenerated by the fluid. In this second position it is preferred, that the fluid flow to the other partial duct or the other partial ducts is blocked (shut-off), leading to a reverse washing of the filter or the filters, as will be explained later in detail in an example which comprises a blocking element, with such a bearing, that it is rotating.

According to the second possibility of the inventive control device, which also comprises only one single valve device and only one single blocking element, the single blocking element is allocated to all partial fluid ducts. By only one single turning and/or shifting movement of the blocking element, the first or second position is selected for the blocking element. Also this embodiment will be described in detail hereafter in a concrete example, containing a single blocking element with such a bearing, that it is rotating.

In another embodiment of the inventive control device the inventive control device comprises a number of valve devices corresponding to the number of the partial fluid ducts, each valve device comprising a blocking element, positioned in the fluid stream of the respective partial fluid duct. According to this other embodiment of the inventive control device it is possible to bring each blocking element, arranged in each single partial fluid duct, individually by rotation and/or shifting from the first position into the second position and in the reverse direction. In this embodiment of the inventive control device it is of course not allowed, that all blocking elements in the valve devices are in the same position.

In principle, with respect to the number of the partial fluid ducts in the inventive control device, it is to be emphasised, that at least two partial ducts must be present, in order to enable the already repeatedly described operating modes (first position, second position). It is particularly suitable, when the inventive control device contains two to eight partial fluid ducts, preferably two to four partial fluid ducts.

A further embodiment of the inventive control device contains two partial fluid ducts and two valve devices connected with the partial fluid ducts, whereby each blocking element (shut-off device) of each single valve device is allocated to one partial fluid duct with such a bearing, that it is rotating and movable, and can be brought from the first position into the second position and in the reverse direction.

According to a variation of the previously described embodiments it is possible, to bring the blocking element of each valve device by rotation or shifting in a further third position, whereby in this third position of the blocking element a fluid stream is led to the atmosphere. According to this variation of the inventive control device it is possible to rotate or shift the blocking element or the blocking elements between a first position, a second position and the above-described third position in any wanted manner. Depending on the particular selected operating mode and the position of the blocking element or the blocking elements the fluid is completely filtered, a partial stream of the fluid is filtered, whereas another partial stream of the fluid is used for the reverse regeneration of the filter, the fluid containing the particles being led to the atmosphere or the fluid stream is removed directly without passing the filter at all. The last possibility is used in particular situations, when during the initial phase of the production the fluid is strongly contaminated. It is of course possible in the abovedescribed variation of the inventive control device to bring the blocking element not only from the first position into the second position and from the second position into the third position or the other way round. It is rather possible to bring the blocking element for instance from the first position directly into the third position or the other way round or from the third position alternatively into the second position or directly into the first position, without the necessity in the last case to pass through the second position.

In the previous lines the blocking element or the blocking elements have been discussed in connection with the valve device or the valve devices in a general manner. Once again, there are different possibilities for the concrete arrangement of the blocking element in the inventive control device. In principle the blocking element must be provided with such a bearing, that it is rotating or movable and that it can be brought in a first position, a second position and when required also in the abovedescribed third position.

It is a preferred embodiment of the inventive control device, that the blocking element of each valve device has the shape of a cylindrical piston (pin), which is arranged in a respective drilling hole in a housing in a fluid-tight manner. With respect to the arrangement of the piston (pin) it is to be emphasised, that the piston is adjusted in such a way, that the piston is mainly perpendicular to the flow direction of the fluid, which means, that the angle formed by the flow direction of the fluid and the longitudinal axis of the cylindrical piston (pin) is about 90°. Furthermore the piston is arranged in such a manner, that it is rotating in the drilling hole in the housing, contains a hole, whereby this hole can be adjusted, according to one arrangement where the cylindrical piston is provided in the fluid supply duct, to the fluid supply duct and brought in alignment with the fluid supply duct, or alternatively this hole can be adjusted to the partial fluid duct and brought in alignment with the partial fluid duct, when the cylindrical piston is provided in the partial fluid duct. In the first position the fluid stream can pass the hole freely, whereas in the second position of the piston the hole is closed after turning the piston (pin), as will be explained hereafter in detail in an example.

According to a variation of the above-described embodiment, according to which the blocking element is a cylindrical piston, a further embodiment of the inventive control device provides a piston, which can be brought in addition into a third position, is preferably by rotation and/or shifting. In this third position of the piston a fluid stream or a partial fluid stream is led to the atmosphere.

In order to enable this above-described third position of the piston, this variation provides a piston, which contains in addition to the previously described hole a gap in the area of the cylinder surface of the piston, which gap only extends over a part of the whole surface of the piston and is arranged at the same axial distance as the hole. This arrangement makes it possible, that this gap, when the piston is turned in an appropriate manner, is brought in alignment with a drain orifice, which opens to the atmosphere, so that alternatively in the first position of the piston the fluid flows through the hole, or after rotation or shifting of the piston the fluid stream is blocked or after further rotation of the piston the gap is brought in alignment with the drain orifice, which makes it possible that fluid or part of the fluid is removed from the control device to the atmosphere.

In particular the drain orifice in the inventive control device is shaped as a draining duct, whereby the draining duct is arranged in such a manner, that its axial length is kept possibly short, until this duct reaches the atmosphere.

In particular when the inventive control device has such a construction, that each partial fluid duct comprises the previously described blocking element shaped as a cylindrical piston (pin), it is possible to adapt the flowing conditions and reverse washing cycles individually to the prevailing requirements.

In a further variation of the inventive control device the blocking element of each valve device does not have the shape of a cylindrical piston, as was described before, but rather as a disc-shaped blocking element (shut-off device). This disc-shaped blocking element is arranged in such a manner relative to the flow of the fluid in the fluid supply duct when it is provided in the fluid supply duct or the flow of the fluid in the partial fluid ducts, when it is provided in the partial fluid ducts, that the flat surfaces of the disc-shaped blocking element are mainly perpendicular to the flow direction of the fluid. This means, that the flat surfaces of the disc-shaped blocking element mainly form an angle of 90° with the flow direction of the fluid in the fluid supply duct or the split fluid ducts. Furthermore the disc-shaped blocking element comprises at least one first opening, which opening extends from the front flat surface to the back flat surface other front surface of the disc-shaped blocking element. This first opening, which is preferably shaped as a drilling hole, can be aligned with the fluid supply duct, when the disc-shaped blocking element is provided in the fluid supply duct, or with the partial fluid ducts, when the disc-shaped blocking element is provided in the partial fluid ducts in such a way, that by a rotation of the disc-shaped blocking element the first hole is aligned with the fluid supply duct or the partial fluid ducts, which represents the first position of the disc-shaped blocking element. Further rotation brings the first hole in such a position, that it not aligned any more with the fluid supply duct or the partial fluid ducts, so blocking the fluid flow in these ducts, which represents a second position of the disc-shaped blocking element (shut-off device).

A variation of the above-described embodiment of the inventive control device, which comprises a disc-shaped blocking element, provides the positioning of the disc-shaped blocking element by rotation into an additional third position, this third position allowing the draining of the fluid stream to the atmosphere.

In order to make this third position of the disc-shaped blocking element and the corresponding draining of a fluid stream to the atmosphere possible, the disc-shaped blocking element comprises a gap arranged in the disc-shaped blocking element, which can be brought in alignment with a draining opening to the atmosphere. This gap only extends over a part of the thickness of the disc-shaped blocking element.

In principle this draining opening can have any shape, provided that fluid can be led through this draining opening to the atmosphere. It is particularly preferred to give the draining opening the shape of a draining duct running radially through the disc-shaped blocking element in front of the gap.

Previously in connection with the blocking element a disc-shaped blocking element was described, whereby it is not necessary, that it must under any circumstances be a blocking element with such a shape, that its flat surfaces are completely circular. It is a further possibility, that the blocking elements comprise partly circular discs, the flat surfaces of which then have the shape of a semi-circle or a circle segment.

It is a further embodiment of the inventive control device, that the blocking element of the valve device or the blocking elements of the valve devices is or are arranged with such a bearing, that they are only rotating or movable from the first position into the second position. In order to make it possible to remove partial fluid streams contaminated with particles, which is wanted in such cases, when at least one filter of the valve device is washed or subjected to reverse washing, this embodiment of the inventive control device comprises an additional stop valve, allocated to the fluid supply duct, the fluid removal duct, each partial fluid duct or each filtering device. This stop valve closes in its closed position an opening to the atmosphere, whereas in its open position it is possible to lead a fluid stream contaminated with particles away from the control device to the atmosphere.

With respect to the shape of the filtering device comprised by the inventive control device, it is to be emphasised, that this filter device can basically be of any shape, provided that the partial fluid stream to be filtered flows through the at least one filter contained in the filtering device in a regular manner. In particular when the inventive control device is used for the cleaning of thermoplastic synthetic masses it is preferred, that the filtering device comprises at least one filter arranged in a piston (pin), whereby this piston is then arranged in such a manner inside a corresponding drill hole in the housing of the control device, that it is movable in an axial manner and the filter is changed by just an axial shifting movement of the piston. Such a filter arrangement is known in the art and is in technological use in many different shapes.

For the arrangement of the previously described stop valve (shut-off valve) in the inventive control device, it is proposed, to arrange this stop valve in a zone upstream from the filter. This arrangement makes it possible, that when the filter is subjected to reverse washing, the fluid containing the particles is led to the atmosphere in the immediate proximity of the filter, when the stop valve is in its opened position. This arrangement of the stop valve has the further advantage, that in the regeneration position the zone upstream from the filter can be made perfectly free from any foreign particles, so that such a regenerated filter is available for a further filtering of the partial fluid stream within the shortest delay.

In particular in this above-described embodiment the stop valve is arranged at the opening of a draining duct which connects the zone with the atmosphere, and is preferably shaped as a disk valve.

In connection with the inventive control device a number of embodiments have been described above, in which the regeneration of the filter surfaces containing the particles is effected in such a way, that in the second position of the blocking element in the valve device at least one partial fluid stream is filtered, whereas at least one other partial fluid stream is diverted and led through the ducts, connected with the filter to be regenerated, and the filter itself in a direction which is opposite to the usual flow direction, so effecting a washing away of the particles present on the surface of the filter. Such an operational mode is called reverse washing in the present invention. The subsequent embodiments of the inventive control device have however such a construction, that the partial fluid stream used for the regeneration of the filter is not diverted in another direction, so that this type of regeneration is called hereafter shortly washing of the filter.

In order to make this above-mentioned washing of the filter possible, a further embodiment of the inventive control device provides, that the stop valve which was described already before and that in its opened position allowed a draining off of a partial fluid stream to the atmosphere, is positioned downstream from the filter. According to this embodiment the filter is arranged in the fluid stream to be filtered in such a manner, that the filter surface containing the dirt or particles can be washed by the fluid by a change in the positioning of the filter. The fluid, containing particles washed away from the filter surface, can be led to the atmosphere through the opened stop valve. In other words it is according to this embodiment not required to change the flow direction of a partial fluid stream in the regeneration position, but is the position of the filter changed instead, followed by a washing of the filter by the corresponding partial fluid stream.

In order to make it possible to change the position of the filter, it is proposed to arrange the filter in the previously described piston (pin) in such a manner, that it is rotating.

It is a further embodiment of the inventive control device, containing a filter the position of which can be changed, that the stop valve is arranged in such a way to the filter, that it blocks additionally the zone downstream from the filter or the section of the corresponding partial fluid duct. In this way the partial fluid stream contaminated with particles is led completely to the atmosphere during the regeneration of the filter. This embodiment of the inventive control device is in particular used in those instances, where the particles washed from the filter do not gather at the bottom of the zone or the section of the partial fluid duct due to the influence of gravity and can be discharged through the opened stop valve at the bottom.

In order to avoid in the inventive control device the generation of dead zones in the fluid stream, it is a particularly preferred embodiment of the inventive control device, that there is a turbulence-promoting device in the connecting area of the fluid supply duct with the partial fluid ducts. This guarantees in a particularly suitable manner, that all partial fluid ducts, which branch off in the connecting area of the fluid supply duct, are always supplied with the same amount of fluid. Depending on the type of fluid such turbulence-promoting devices may be shaped as a wide-meshed sieve or as projections in the connecting zones or as deflectors.

As has been mentioned before repeatedly, the inventive control device is particularly useful in pumps for melted masses and/or extruders used for the extrusion of thermoplastic synthetic material. The control device is constructed in such a way and provided with such appropriate mountings, that the control device can be mounted in a position downstream from the feed screw of the extruder for the synthetic material and/or the pump for the melted masses and upstream from its extruder die. Due to the fact, that in such a construction of the control device a marked back pressure is built up before the extruder die, it is possible to abandon the use of a further valve device allocated to the fluid removal duct in those embodiments of the inventive control device, which use a reverse washing for the regeneration of the filter or the filters.

If however the inventive control device is used for other purposes, it is recommended to allocate a further valve device in the fluid removal duct, which further valve device should comprise at least one first valve position in which the amount of fluid through the fluid removal duct is not limited and a second valve position in which the amount of fluid transported through the fluid removal duct is limited.

A special and particularly suitable embodiment of the inventive control device, comprising two partial fluid ducts and two valve devices allocated to the partial fluid ducts, in which each blocking element of each valve device is movable by rotation from the first position into the second position and the other way round, comprises the presence in each partial fluid duct of a first duct section, downstream from the fluid supply duct and forming an angle α of 120° to 160° with the fluid supply duct. This first duct section is followed in the direction of the fluid stream by a corresponding second duct section, whereby the two second duct sections of the two partial fluid ducts are running mainly in a parallel fashion. This section is followed in the direction of the fluid stream by a corresponding third duct section, which connects the second duct section with the fluid removal duct and forms an angle β of 120° to 140° with the common fluid removal duct. This arrangement and construction of the partial fluid ducts guarantees, that the same amount of fluid is transported through each partial fluid duct, in particular in those instances, where the inventive control device is used in an extruder and/or a pump for melted masses of thermoplastic synthetic material.

According to a variation of the above-described embodiments of the inventive control device each first duct section preferably comprises a valve device as described before.

In order to make sure, that the filtering device arranged in each partial fluid duct can be accessed easily, in particular for all kinds of reparations, it is recommended as a further variation of the previously described special embodiment to arrange this filtering device in the second duct section.

So far mainly such embodiments of the inventive control device have been described, in which the blocking element or the blocking elements are preferably arranged with a bearing in such a fashion, that it or they are rotating.

According to a particularly suitable embodiment of the inventive control device the blocking element can be moved from the first position into the second position by a shifting movement, in particular in axial direction.

In particular in those, already repeatedly described instances, when the inventive control device comprises two partial fluid ducts and two valve devices, whereby each partial fluid duct is allocated to the one blocking element of the respective valve device, the above-mentioned axial movement is particularly suitable.

According to a particularly advantageous embodiment the inventive control device comprises a valve device, which contains a cylindrical drill hole in its housing and a cylindrical blocking element arranged in this drill hole. The cylindrical blocking element is arranged in the drill hole with such a bearing, that it can be moved by axial shifting and provides a closed contact between the cylindrical blocking element and the cylindrical drilling hole of the valve device. The cylindrical drill hole in the housing is provided with two radially opposite drilling holes, with access to corresponding partial duct sections. The cylindrical blocking element comprises a first drill hole, which is shaped as a drill hole radially running through the whole diameter of the blocking element. This first drill hole makes sure, that in the first position of the valve device a fluid flows from the common fluid supply duct to the corresponding partial fluid duct. Furthermore the cylindrical blocking element comprises a second hole arranged at axial distance from the first drill hole, whereby this second hole extends radially only over a part of the diameter of the blocking element. This second hole joins a first draining duct extending axially through the blocking element, whereby this first draining duct is open to the atmosphere. This second hole in connection with the axially extending first draining duct makes sure, that the fluid stream containing the particles washed from the respective filter can be led outside to the atmosphere in the second position of the valve device (position for reverse washing), bringing about the wanted cleaning of the filter. It is then possible, by a axially shifting movement of the cylindrical blocking element relative to the cylindrical drill hole in the housing, to move the blocking element from the first position in which the first drill hole is in alignment with the two drill holes in the wall of the housing and the fluid flows through the respective partial fluid duct in the direction of the corresponding filter, to the second position. In this second position the second hole of the blocking element is in alignment with only one of the two drill holes in the housing. Hereby this one of the two holes in the housing is the hole, which is arranged downstream viewed in the direction of the fluid stream. As has been explained previously, the fluid stream, containing the particles from the filter, is now led to the atmosphere, through the second hole in the blocking element and the connected draining duct also present in the blocking element.

In a variation of the previously described embodiment of the valve device the blocking element comprises a third hole, radially extending over only a part of the diameter of the blocking element. This third hole joins a second draining duct, which extends axially through the blocking element, or in a lateral fluid duct, this second draining duct or lateral fluid duct being open to the atmosphere. The third hole is arranged in the blocking element preferably at axial distance of the first drill hole and the second hole and radially opposite from the second hole, so that it is only required to perform an axial movement of the blocking element relative to the hole in the housing, to bring the third hole in alignment with the hole in the blocking element which is directed to the fluid supply duct. In other words it is possible by an axial displacement of the blocking element relative to the boring in the housing to bring the blocking element in the previously described third position of the blocking element. In this third position of the blocking element the fluid, which is upstream from the valve device, can be drained to the atmosphere, which enables a draining away of the fluid from the inventive control device during the initial phase of the process.

It is a particularly suited variation of the previously described embodiment of the inventive control device, that the second and/or the third hole present in the blocking element provide an elliptical cross-section. This variation makes it possible, to supply the first or second draining duct or the lateral fluid duct with a specific proportion of the fluid stream by an axial displacement of the blocking element relative to the hole in the housing. Furthermore the elliptical cross-section of the second or third boring inhibits, that a spontaneous pressure reduction occurs in the fluid stream when it is drained off, so that unwanted disturbances, for instance sudden pressure changes, are avoided.

In addition to the previously described elliptical shape of the second and/or the third drill hole or instead of this shape, it is possible, that the second and/or the third drill hole and/or the first and/or second draining duct and/or the lateral fluid duct comprises a section, in which the diameter of the drilling hole, of the lateral fluid duct or the draining duct tapers or can be tapered. It is also an effect of this tapering, that the amount of the fluid stream, which drains to the atmosphere is limited or can be limited, is so that this embodiment allows the adaptation of the inventive control system to the prevailing conditions.

Depending on the respective requirements and factors, the inventive control device can be constructed as one part or in more parts. In particular, when it is necessary to adapt an existing control device in order to provide the same advantages, as have been described in the previous description for the inventive control device, it is proposed, to give the already present control device which is to be adapted, a construction in two parts. This control device then provides a valve device which can be disconnected from the control device.

It is a further variation of the previously described embodiment, to provide the inventive control device with a construction in three parts. In this particular case the control device consists of a valve device, a connecting element containing the sections of the partial fluid ducts and the filter head comprising the filtering devices and their respective ducts.

Preferred embodiments of the inventive supporting plate are described in the dependent claims.

The inventive control device is disclosed in the following eight examples in more detail, with reference to the accompanying drawings. The figures represent:

FIGS. 1 to 4 a first embodiment of the inventive control device, wherein

Figure 1:
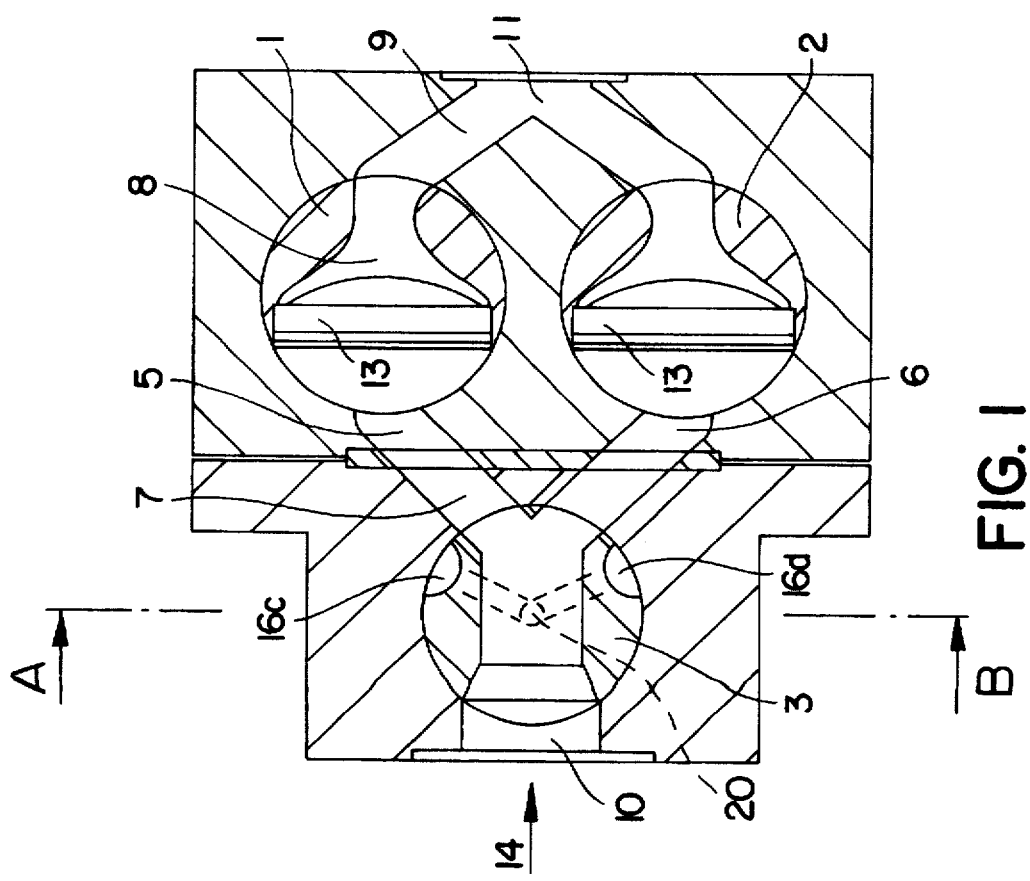
Figure 4:
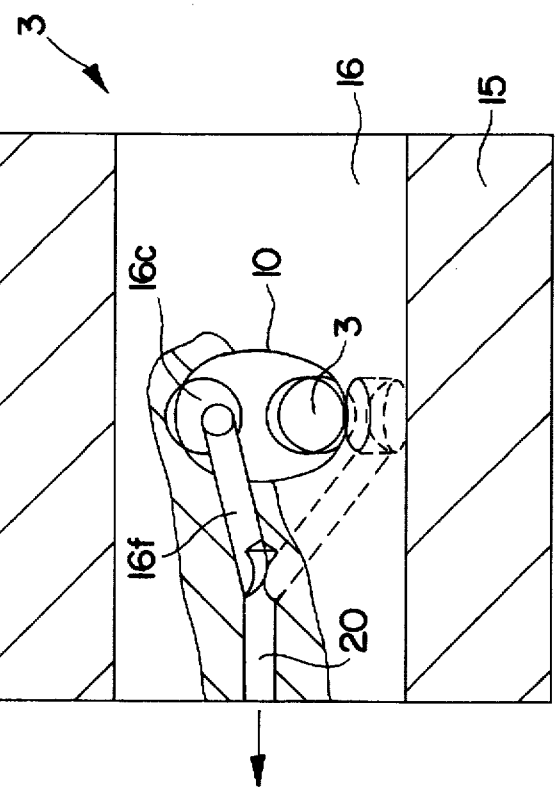
Figure 3:
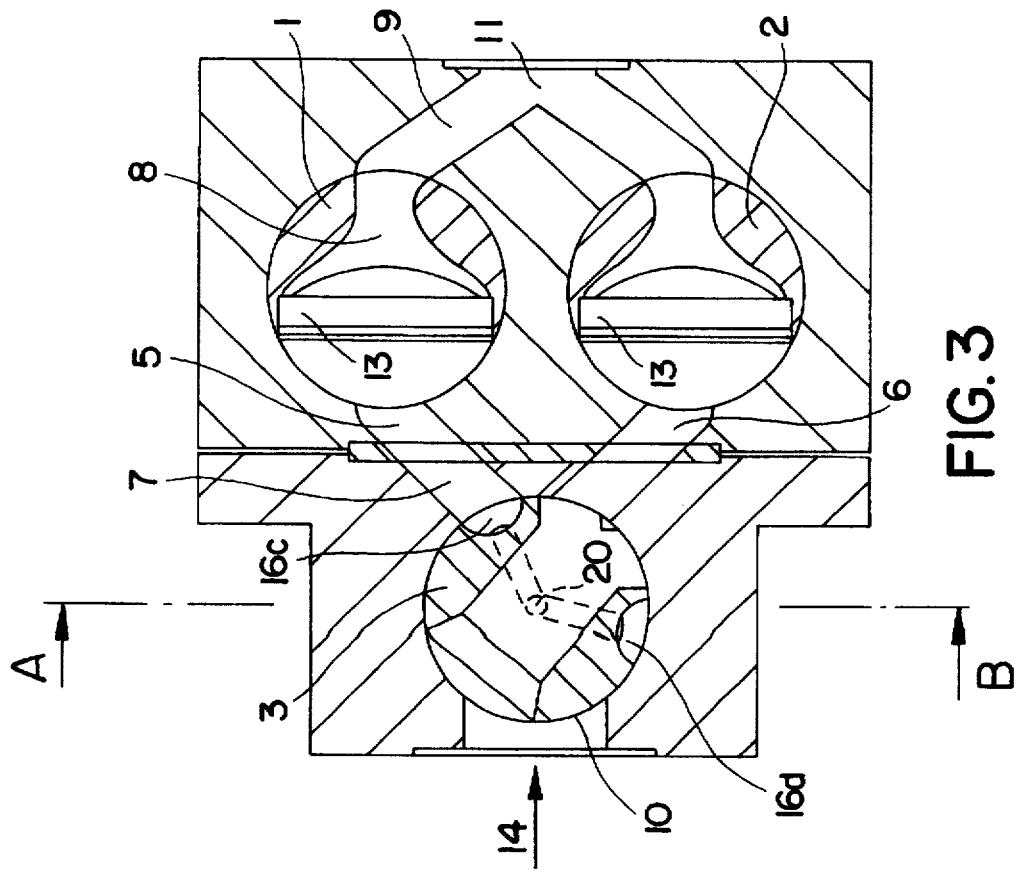

FIG. 1 a schematic sectional view from the side of the control device in the first position of the blocking element;

FIG. 2 a schematic sectional view along the line A–B in FIG. 1;

FIG. 3 a schematic sectional view of the control device in the second position of the blocking element:

FIG. 4 a sectional view along the line A–B in FIG. 3;

FIGS. 5 to 8 a second embodiment of the control device, wherein

FIG. 5 a schematic sectional view from the side of the control device in the first position of the blocking element;

FIG. 6 a schematic sectional view along the line A–B in FIG. 5;

FIG. 7 a schematic sectional view of the control device in the second position of the blocking element;

FIG. 8 a sectional view along the line A–B in FIG. 7;

FIGS. 9 to 14 a third embodiment of the control device, wherein

Figure 10:
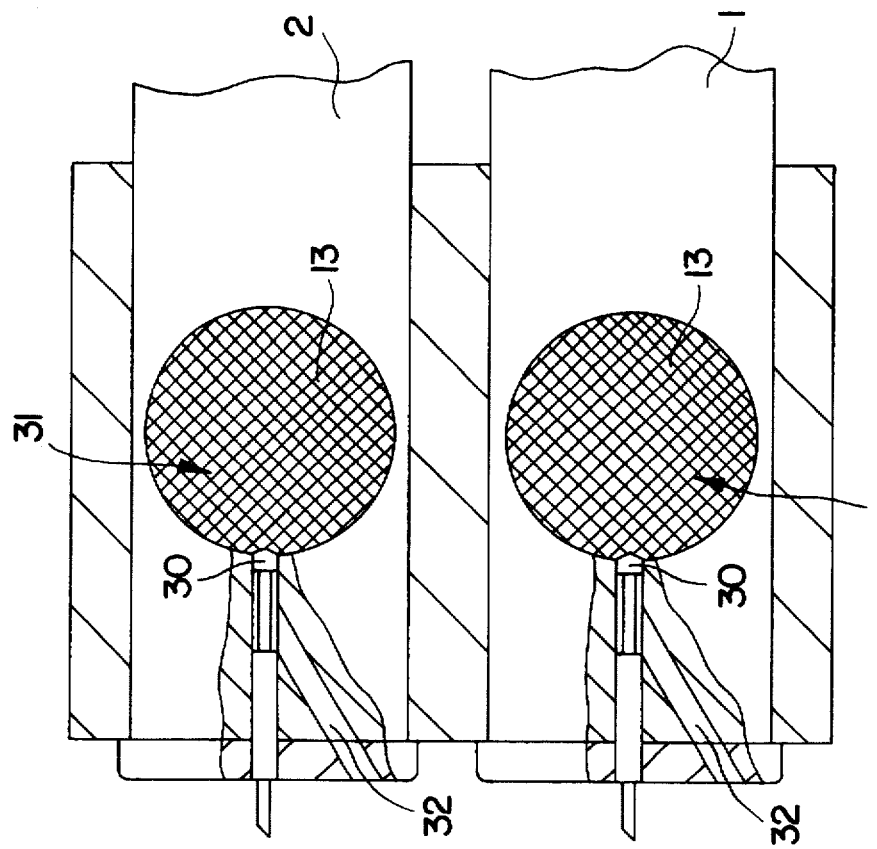
Figure 9:
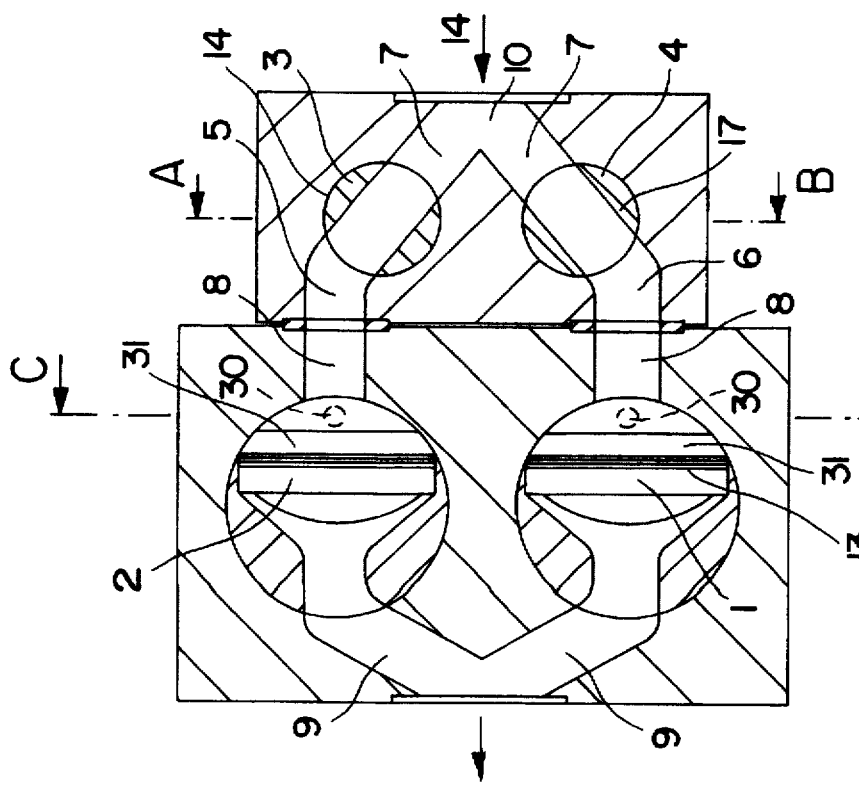
Figure 14:
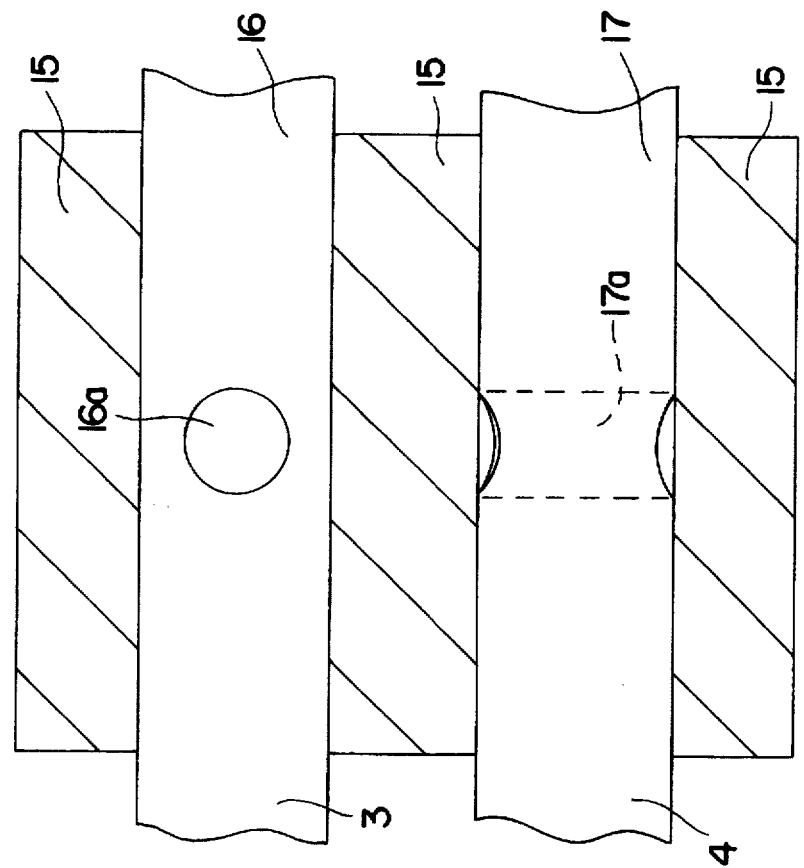
Figure 13:
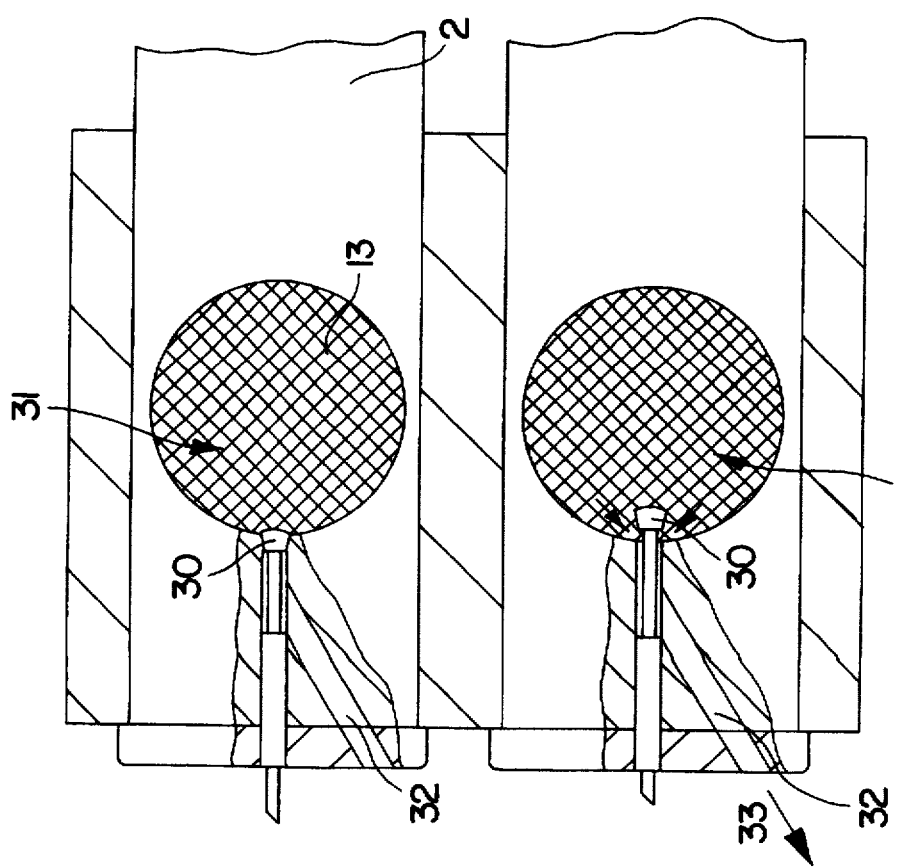

FIG. 9 a schematic sectional view from the side of the control device in the first position of the blocking element;

FIG. 10 a schematic sectional view along the line C–D in FIG. 9;

FIG. 11 a schematic sectional view of the blocking element in the first position;

FIG. 12 a schematic sectional view of the control device in the second position of the blocking element;

FIG. 13 a sectional view along the line C–D in FIG. 12;

FIG. 14 a schematic sectional view of the blocking element in the second position;

FIGS. 15 to 18 a fourth embodiment of the control device, wherein

Figure 15:
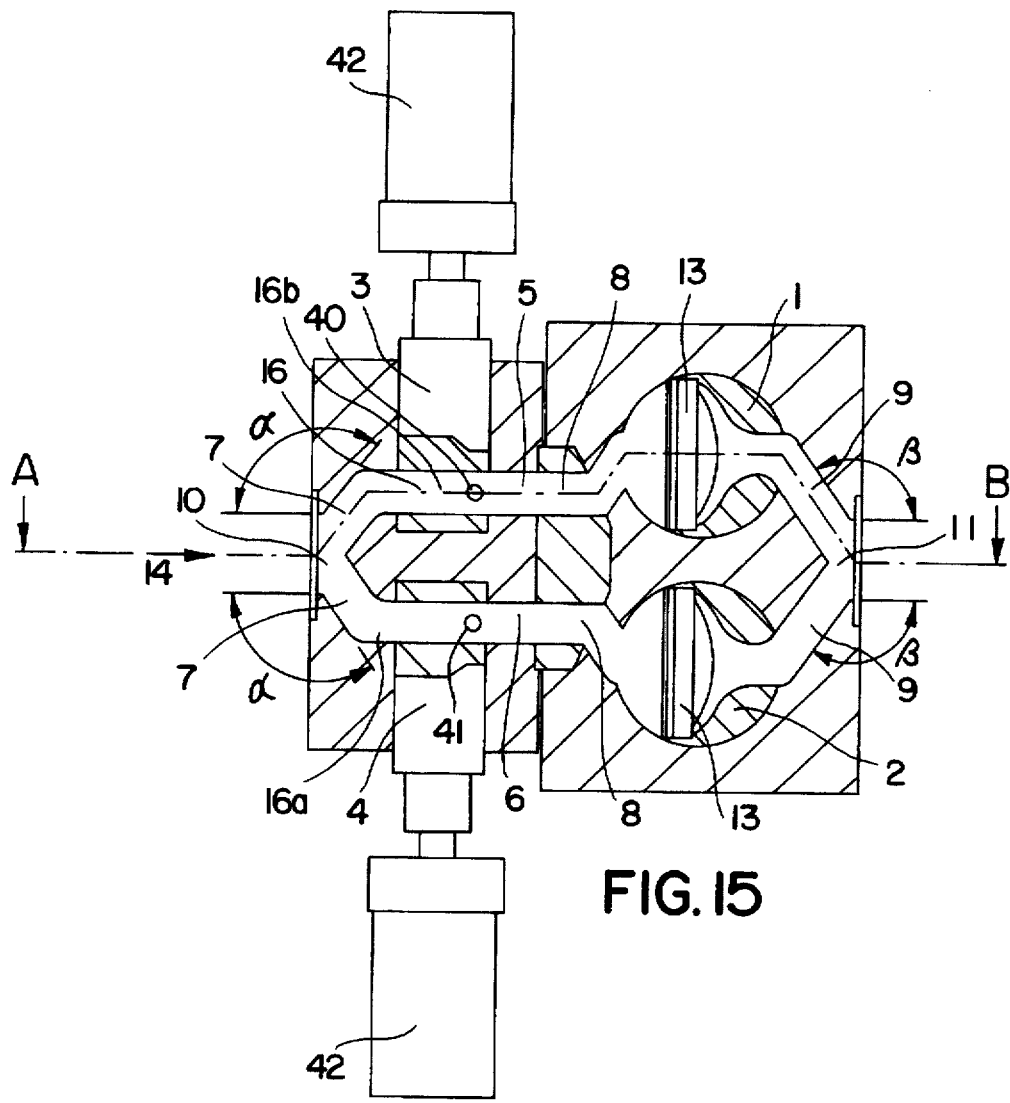
Figure 16:
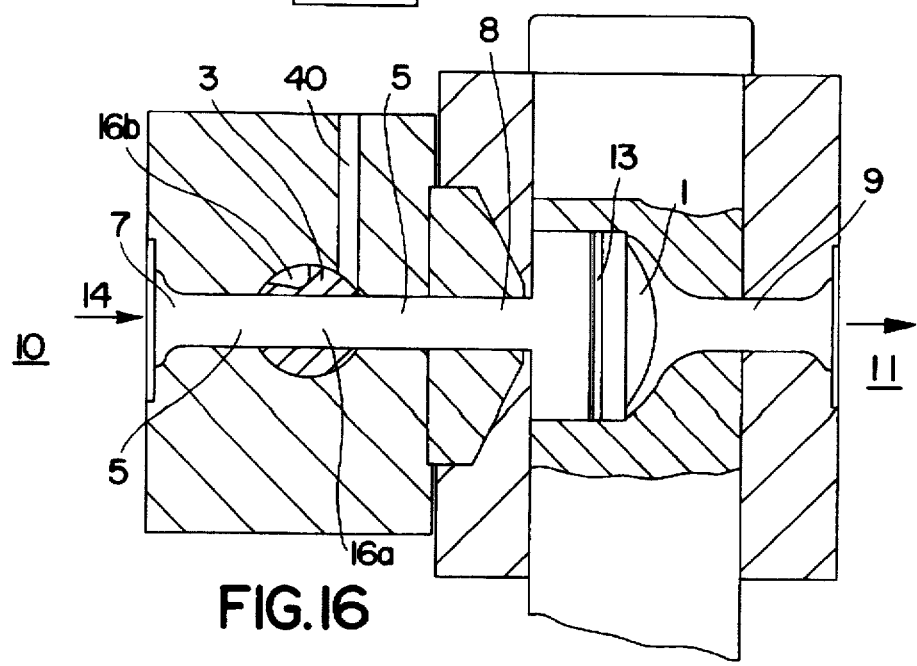
Figure 17:
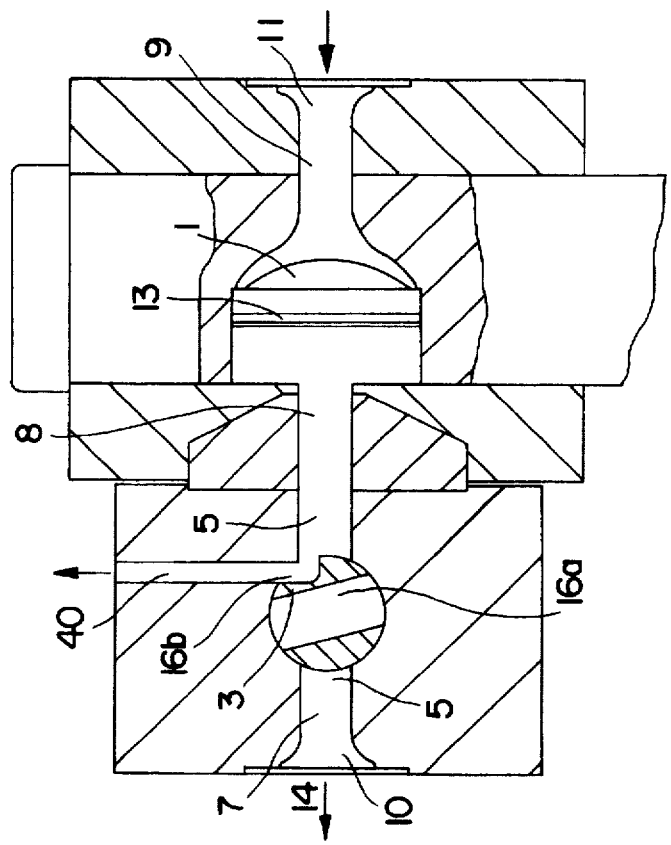
Figure 18:
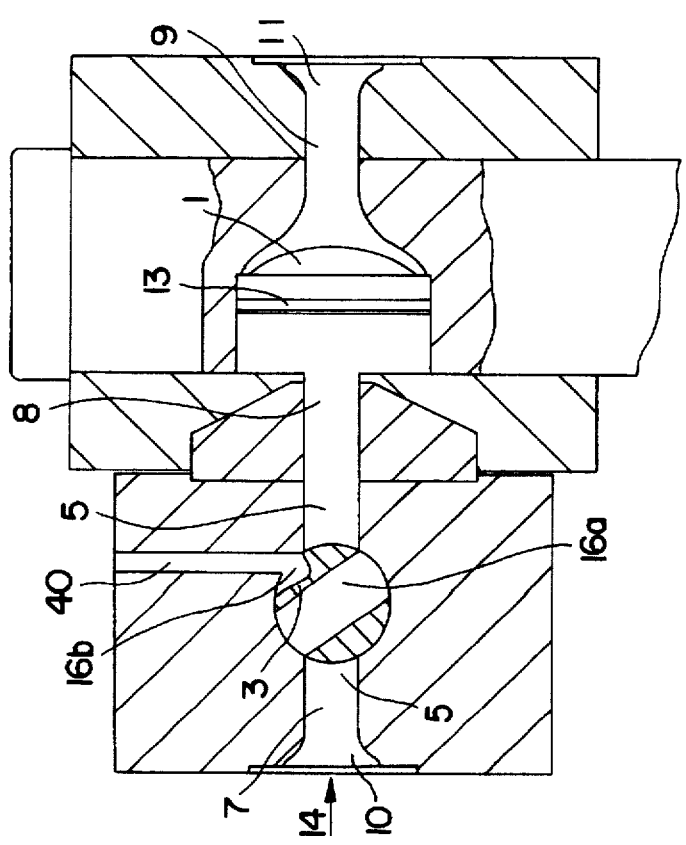

FIG. 15 a schematic sectional view from the side of the control device in the first position of the blocking element;

FIG. 16 a schematic sectional view along the line A–B in FIG. 15;

FIG. 17 a schematic sectional view along the line A–B in FIG. 15, however in the second position of the blocking element;

FIG. 18 a sectional view along the line A–B in FIG. 15, however in the third position of the blocking element;

FIGS. 19 to 24 a fifth and sixth embodiment of the control device, wherein

Figure 20:
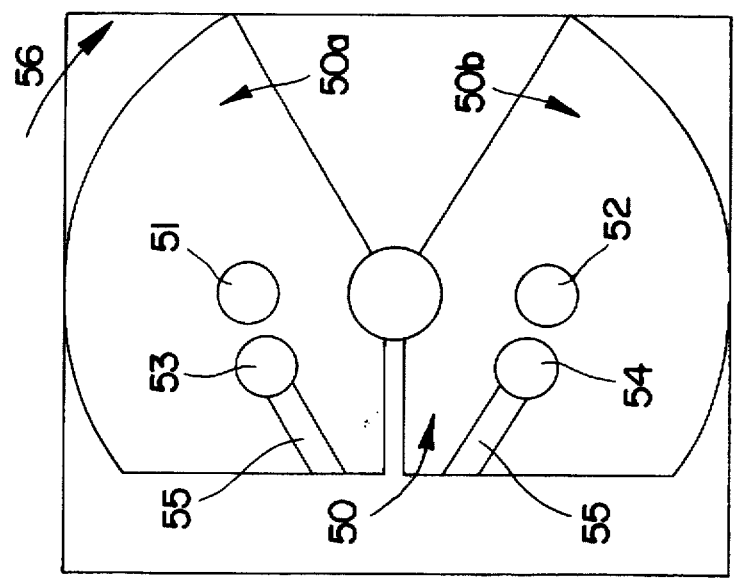
Figure 19:
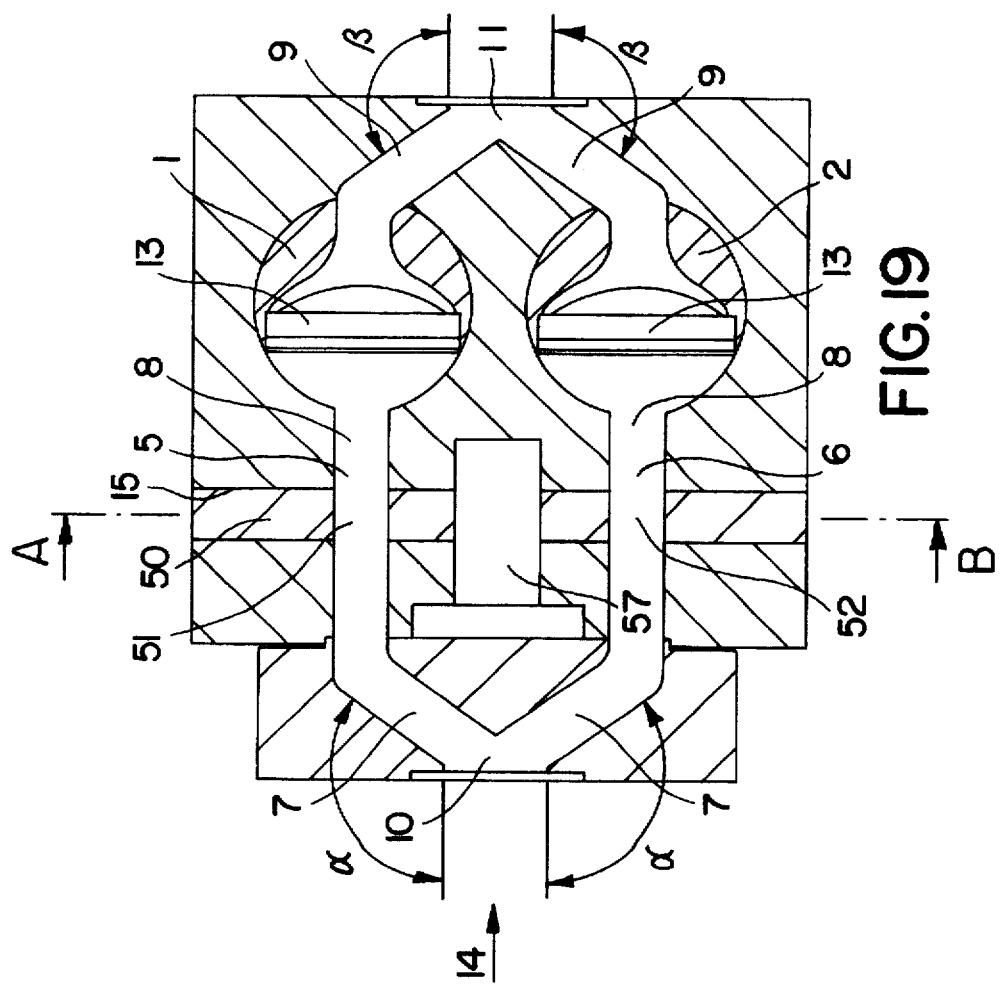
Figure 24:
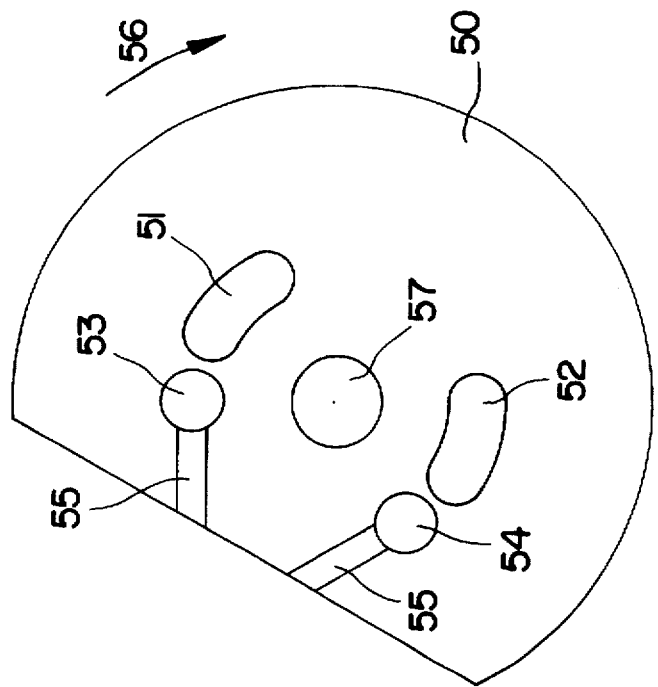
Figure 23:
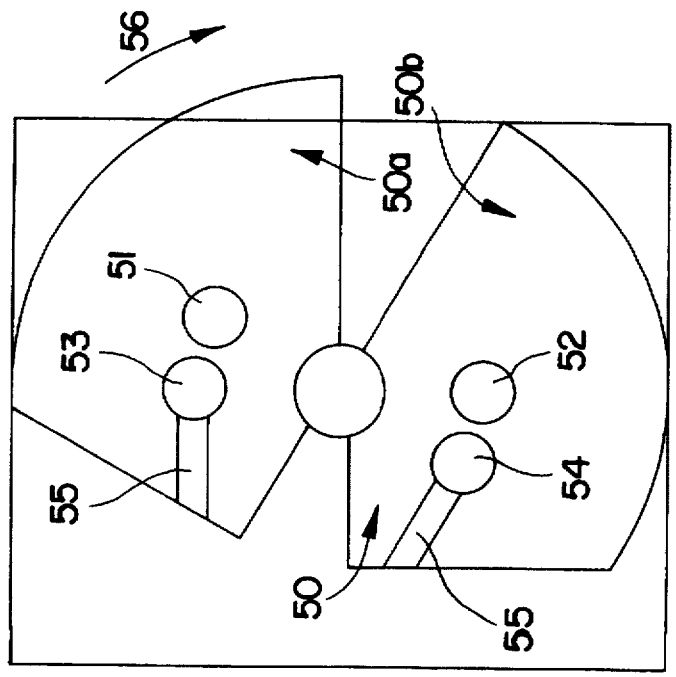

FIG. 19 a schematic sectional view from the side of the control device in the first position of the blocking element;

FIG. 20 a schematic sectional view along the line A–B in FIG. 19 for a first embodiment of a disc-shaped blocking element in its first position;

FIG. 21 a schematic sectional view along the line A–B in FIG. 19 for a second embodiment of a disc-shaped blocking element in its first position;

FIG. 22 a schematic sectional view from the side of the control device in the second position of the blocking element;

FIG. 23 a sectional view along the line A–B in FIG. 22 for the first embodiment of a disc-shaped blocking element in its second position; and FIG. 24 a schematic sectional view along the line A–B in FIG. 22 for the second embodiment of a disc-shaped blocking element in its second position;

FIGS. 25 to 30 a seventh embodiment of the control device, wherein

Figure 26:
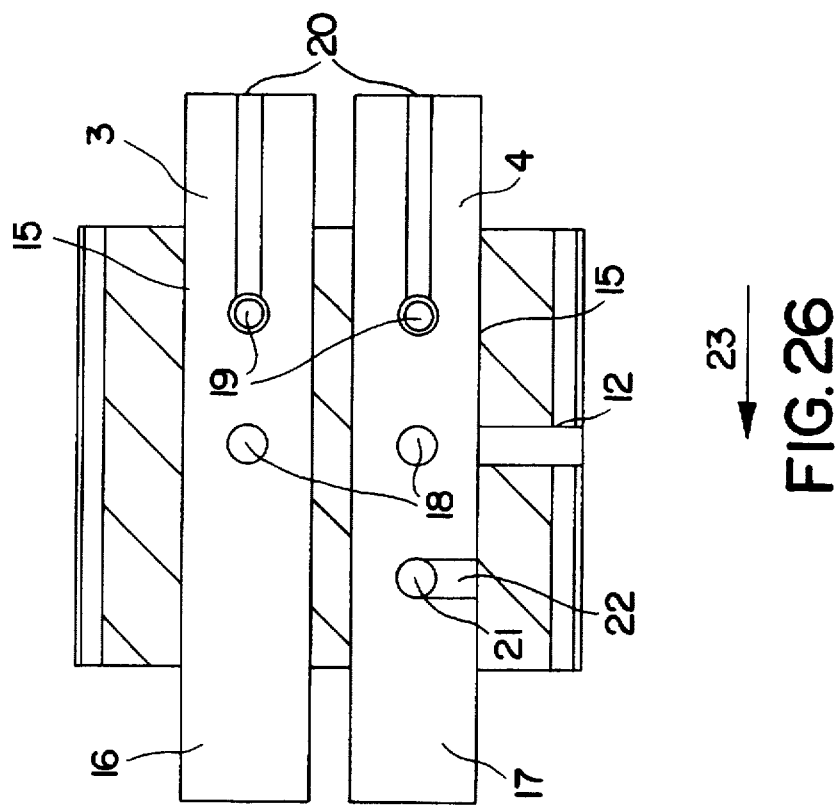
Figure 25:
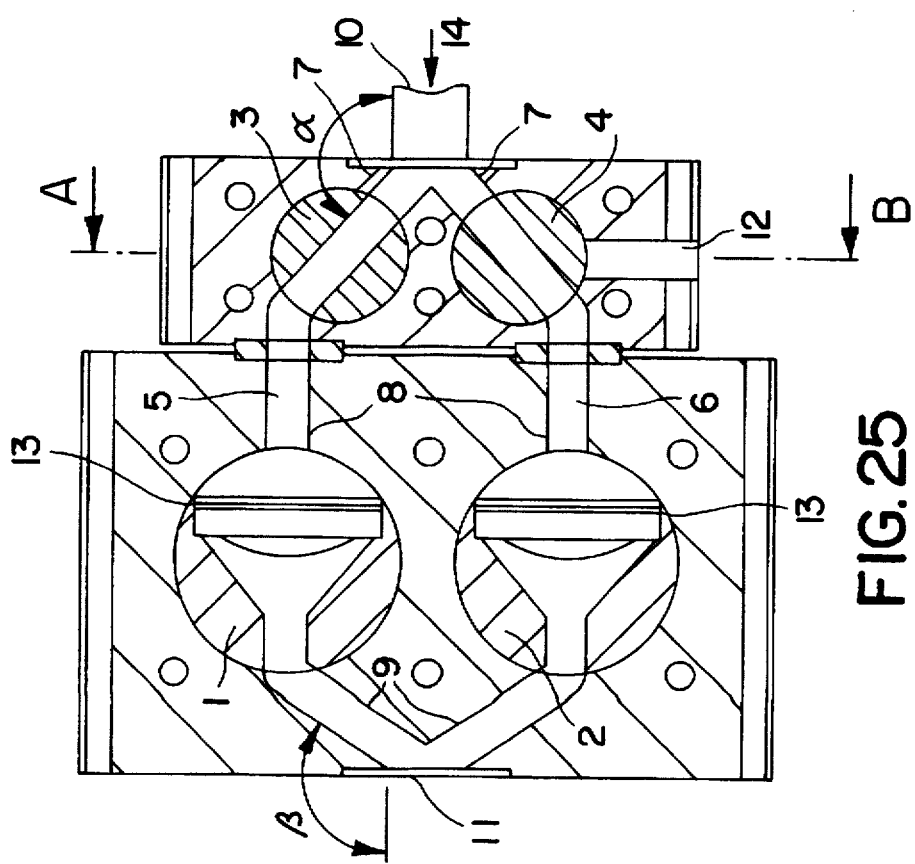

FIG. 25 a schematic sectional view from the side of the control device in the first position of the blocking element;

FIG. 26 a sectional view along the line A–B in FIG. 25;

FIG. 27 a schematic sectional view from the side of the control device in a second position of the blocking element;

FIG. 28 a sectional view along the line A–B in FIG. 27;

FIG. 29 a sectional view from the side of the control device in the third position of the blocking element; and FIG. 30 a sectional view along the line A–B in FIG. 29;

FIGS. 31 to 36 an eighth embodiment of the control device, wherein

Figure 32:
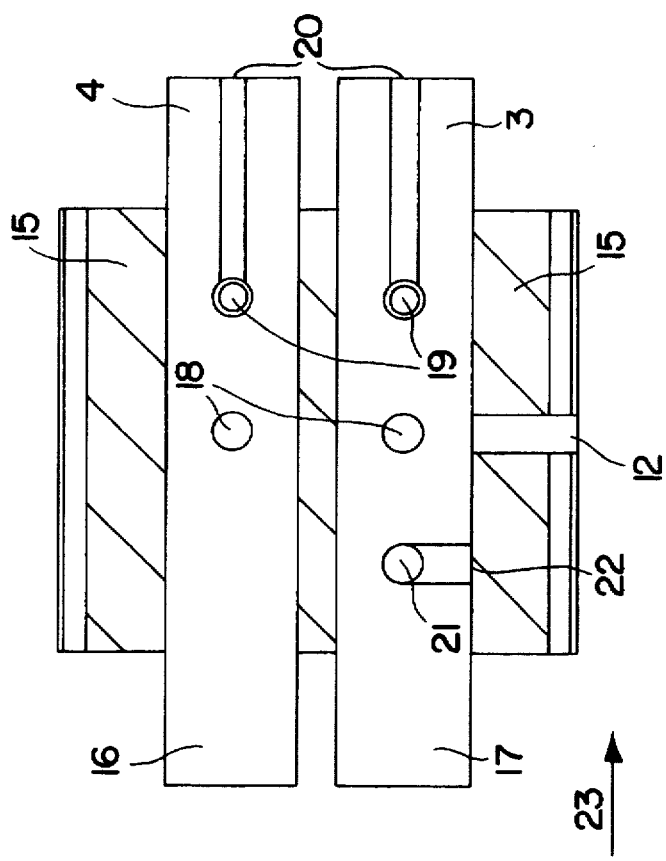
Figure 31:
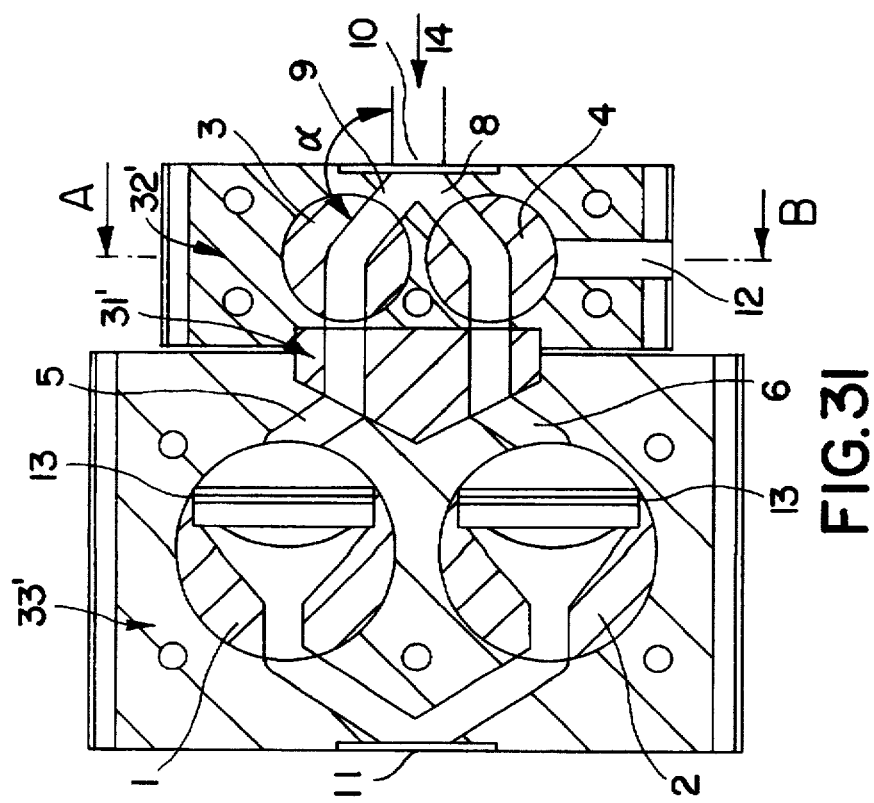

FIG. 31 a schematic view from the side of the control device in the first position of the blocking element;

FIG. 32 a sectional view along the line A–B in FIG. 31;

FIG. 33 a schematic sectional view from the side of the control device in the second position of the blocking element;

FIG. 34 a sectional view along the line A–B in FIG. 33;

FIG. 35 a sectional view of the control device in the third position of the blocking element; and FIG. 36 a sectional view along the line A–B in FIG. 35.

In the FIGS. 1 to 36 the same parts are represented with the same symbols.

In the FIGS. 1 to 4 a first embodiment of the control device is represented. This control device comprises in flow direction of the fluid a fluid supply duct 10 and hereafter a valve device 3, the fluid supply duct 10 branching downstream from the valve device 3 in two partial fluid ducts 5 and 6. Each partial fluid duct 5 and 6 is provided with a filtering device 1 or 2, whereby the filter 13 or a filter package 13 is perpendicular to the direction of the fluid flow represented by the arrow 14. Each partial fluid duct 5 or 6 possesses a first duct section 7, a connected second duct section 8 as well as a third duct section 9, whereby the duct sections 7 to 9 have only been numbered in partial fluid duct 5. Downstream from the filtering device 1 or 2 the two partial fluid ducts 5 and 6 are joined to a common fluid removal duct 11.

In the sectional view according to FIG. 2 an enlarged representation of the valve device 3 is shown. The valve device 3 comprises a valve chamber 15, which contains in the drill hole of the valve chamber 15 a blocking element or shut-off device 16. The blocking element 16 is in a first embodiment according to FIGS. 1 to 4 shaped as a cylindrical piston (pin). The cylindrical piston 16 is arranged relative to the fluid supply duct 10 in such a way, that its longitudinal axis forms an angle of about 90° with the fluid supply duct.

The piston 16 is fluid-tight and is fitted in a rotating manner in the drill hole of the valve chamber 15. Furthermore the piston 16 comprises two adjacent holes 16a and 16b, both holes 16a and 16b being in alignment with the fluid supply duct 10, as has been represented in FIG. 2. At the same axial level as the two holes 16a and 16b, there are further adjacent holes 16c and 16d respectively, these two holes 16c and 16d not extending over the whole radial thickness of the piston 16, but rather joining the ducts 16f, which join a draining duct 20 axially extending through the piston 16, whereby the draining duct 20 is open to the atmosphere.

The first embodiment of the control device shown in the FIGS. 1 to 4 has the following mode of action:

During the operational mode shown in FIGS. 1 and 2, which has been characterised before as the first position, the fluid to be filtered, for instance the thermoplastic synthetic material, passes the control device through the fluid supply duct 10 in the direction of the arrow 14. After passing the valve device 3, the piston 16 of which is in the first position (FIG. 2), the fluid stream is divided in the direction of the arrow 14 equally over both partial fluid ducts 5 and 6 and filtered there by the two filtering devices 1 and 2. After passing the filtering devices 1 and 2 the fluid, which is now in a filtered state, reaches through the fluid removal duct 11 for instance the die of an is extruder (not shown). In this operational mode the piston 16 of the valve device 3 is in its first position, as shown in FIG. 2, so that the flow of the fluid stream from the fluid supply duct 10 to the fluid removal duct 11 is not obstructed.

When it is observed, that a filter 13 of the filtering device 1 or 2 is covered with dirt particles and for that reason a regeneration is required, the piston 16 is moved from its first position as shown in FIGS. 1 and 2, to a position, which has been called before the second position and is shown in FIGS. 3 and 4. In this second position, which can also be called the position for reverse washing, there is still fluid led to the fluid supply duct 10 in the direction of the arrow 14, whereby the fluid then flows through the partial fluid duct 6 in the direction of the fluid removal duct 11, in such a way, that it passes the filtering device 2 and is filtered there. The partial fluid duct 5 is blocked at this moment for fluid supply by the position of the stop piston 16, as is shown in FIGS. 3 and 4. Due to the fact, that a back pressure is built up by the presence of the die of the extruder (not shown) downstream from the fluid removal duct 11, a partial stream of the fluid is led from the fluid removal duct 11 through the third duct section 9, the second duct section 8, the filtering device 1 and the first duct section 7 to the piston 16 (FIG. 3), from there through the drill hole 16c, which does not extend over the whole diameter of the piston, and the duct 16f to the draining duct 20. The draining duct 20 is open to the atmosphere, with the result, that the fluid stream passing through it is led away out of the control device. Because the fluid stream passes on its way out the filter 13 or the filters of the filtering device I in a direction, which is opposite to the fluid filtering direction (production mode), the particles separated on the filter or the filters 13 are washed away and removed through the first duct section 7, the drill hole 16c, the duct 16f and the draining duct 20 from the control device, without an interruption of the production. At the end of the reversible washing the piston 16 is again brought in a position, as is shown in the FIGS. 1 and 2.

If it is necessary to perform the reversible washing through the filtering device 2, this is performed in an analogous way. It is only necessary, to bring the piston 16 from its position shown in FIG. 1 in counter-clock manner in such a position, that the drill hole 16d is in alignment with the inlet opening of the partial fluid duct 6. In this position of the piston 16 a way to the atmosphere is opened and fluid containing dirt particles can be removed in the same way as described before for the filtering device 1.

The second embodiment of the control device shown in the FIGS. 5 to 8 is differing from the already described first embodiment of the control device by the fact, that instead of the single valve device a separate valve device 3 and 4 is allocated to each partial fluid duct 5 and 6. Furthermore these valve devices 3 and 4 are constructed differently from the already described single valve device which is connected with the fluid supply duct 10. Otherwise there are no differences between the control devices according to the FIGS. 1 to 4 (first embodiment) and the control device according to the FIGS. 5 to 8 (second embodiment).

As has been shown in FIG. 5, the fluid stream 14 to be filtered is led through the fluid supply duct 10 to the two partial fluid ducts 5 and 6. In the first duct section 7 of each fluid supply duct there is one valve device 3 and 4 respectively. FIG. 5 shows a position (first position) of the control device which is used during the production, enabling the filtering of both partial fluid streams at the same time. This is achieved by arranging a filtering device 1 or 2 in each second duct section 8 of the partial fluid duct or 6. Downstream from the filtering device 1 or 2 the respective third duct sections 9 join together to form the fluid removal duct 11.

The fluid supply duct 10 forms an angle α of about 140° with the first duct section 7 of the partial fluid duct 3 or with the first duct section 7 of partial fluid duct 4. The third duct section 9 forms an angle β of about 130° with the fluid removal duct 11. Both second duct sections 8 of the two partial fluid ducts 5 and 6 are running in a parallel manner.

As is best shown in FIG. 6, each valve device 3 or 4 comprises a valve chamber 15, which comprises a cylindrical drill hole. The cylindrical drill hole contains a blocking element or shut-off device 16 or 17 in the form of a fluid-tight piston. The cylindrical pistons (pins) 16 and 17 are shaped identically and are arranged in a rotating manner inside the hole in the valve chamber 15. By this rotation each piston can take a position as shown in FIG. 6, as well as a position as has been shown for piston 17 in FIG. 8. Because of the identical form of both pistons 16 and 17, only piston 17 will be described hereafter in detail.

The cylindrical shut-off piston 17 is so arranged in the first duct section 7 of the partial fluid duct 6, that its longitudinal axis is mainly perpendicular to the direction of the fluid flow in the partial duct 7. At the axial level of the partial fluid duct 7 the piston 17 comprises a hole 17a which extends over the whole diameter. This hole 17a can take such a position relative to the first duct section 7, that the flow of the fluid in the partial fluid duct 6 is not obstructed, as is shown in FIG. 5 for both valve devices 3 and 4.

At the same axial level, but at a different place of the cross-section, die cylindrical piston 17 comprises a gap 17b. The gap 17b is connected with a draining duct 20 by a partial duct 17c, which draining duct 20 is open to the atmosphere.

Since the piston 17 can be rotated inside the drill hole of the housing 15, alternatively the hole 17a or the gap 17b can be brought in connection with the first duct section 7 of the partial fluid duct 5 or 6. A connection of the partial fluid ducts with the holes 17a and 16a does not obstruct the fluid flow through the valve devices 3 and 4 (first position), as shown in FIG. 5, whereas on the other hand a connection of the gap 17b with the first duct section 7 has the effect, that the fluid flow to the filtering device 2 is blocked, as is shown in FIG. 7 for the valve device 4 (second position).

The second embodiment shown in the FIGS. 5 to 8 is working in the following manner:

In the production position, as is shown in FIGS. 5 and 6, previously mentioned the first position, the fluid to be filtered, for instance the thermoplastic synthetic material, passes the control device through the fluid supply duct 10 in the direction of the arrow 14. After passing the valve devices 3 and 4, the pistons (pins) 16 and 17 of which are in the first position, the fluid stream passing in the direction of the arrow 14 is filtered by the filtering devices 1 and 2 contained in both partial fluid ducts 5 and 6. After passing the filtering devices 1 and 2 the fluid, which is now filtered, reaches for instance the extruder die of an extruder. In this production position the pistons 16 and 17 of the valve devices 3 and 4 do not block the fluid flow from the fluid supply duct 10 to fluid removal duct 11.

When it is observed, that a filter 13 of one of the filtering devices 1 or 2 is covered with dirt particles and a regeneration is therefore required, the cylindrical piston 17 is rotated from its first position shown in FIGS. 5 and 6 into a position, which has been called before the second position and which is depicted for piston 17 in the FIGS. 7 and 8. In this second position, which can also be called the reverse washing position, there is still fluid fed through the fluid supply duct 10 in the direction of the arrow 14. This fluid then flows through the partial fluid duct 5 in the direction of the fluid removal duct 11, passing filter 1 and being filtered there. The partial fluid duct 6 is blocked at this moment for fluid supply by the position of the piston 17, as shown in the FIGS. 7 and 8. Because a back pressure is building up by the die of the extruder (not shown) downstream from the fluid removal duct 11, a partial stream of the fluid is led from the fluid removal duct 11 through the third duct section 9, the second duct section 8, the filtering device 2 to the piston 16 (FIG. 7), from there to the gap 17b, which does not extend over the whole radial cross-section of the piston, and the duct 17c to the draining duct 20. This draining duct 20 is open to the atmosphere, with the effect that the fluid stream flowing through draining duct 20 is removed from the control device. Because the fluid stream passes the filter or the filters on its way out in the opposite direction as in the filtering position (production position), the particles separated by the filter or the filters are washed away and removed from the control device through the gap 17b, the partial duct 17c and the draining duct 20, without any interruption of the production.

At the end of the reverse washing the piston 17 is brought again in such a position, as is shown in the FIGS. 5 and 6.

Should however the filtering device 1 be treated by reverse washing, then this is performed in an analogous manner. Now the cylindrical piston must be brought from the position shown in FIG. 6 into a position, as is shown in FIG. 8 for the piston 17. At this time the piston 17 is in a position as is shown in FIG. 6.

In these above-described two embodiments the second position of the blocking element is identical with the third position of the blocking element.

The third embodiment shown in the FIGS. 9 to 14 is different from the second embodiment, previously described in connection with the FIGS. 5 to 8, in this respect, that here the valve devices 3 and 4 have a different shape and that the filtering devices 1 and 2 contain in addition a stop valve, as is shown in detail in the FIGS. 10 and 13.

As is depicted in FIG. 9, the fluid stream 14 to be filtered is led through the fluid supply duct 10 to the two partial fluid ducts 5 and 6. In the first duct section 7 of each fluid supply duct a valve device 3 or 4 is arranged. FIG. 9 represents a position of the control device (first position) as is needed during the production and which allows the filtration of both partial fluid streams. This is achieved by connecting a filtering device 1 or 2 to each second duct section 8 of the partial fluid duct 5 or 6. Downstream from the filtering device 1 or 2 the respective third duct sections 9 are combined to form fluid removal duct 11.

The fluid supply duct 10 forms an angle α of about 140° with the first section 7 of the partial fluid duct 5 and the first duct section 7 of partial fluid duct 6. The third duct section 9 forms an angle β of about 130° with the fluid removal duct 11. Both second duct sections 8 of the two partial fluid ducts 5 and 6 run in parallel.

As is shown most clearly in FIG. 11, each valve device 3 and 4 contains a valve chamber 15, which comprises a cylindrical drill hole and a stop piston (pin) inside the cylindrical drilling hole, said stop piston being shaped as the fluid-tight blocking element or shut-off device 16 or 17. The cylindrical pistons 16 and 17 are of identical shape and can be rotated inside the drill hole in the valve chamber 15. Each piston 16 and 17 can take a position as shown in FIG. 11, as well a position shown for the piston 17 in FIG. 14. Because of the identical shape of the pistons 16 and 17 only the piston 17 is described hereafter in detail.

The cylindrical stop piston (pin) 17 (FIG. 11) is arranged in the first duct section 7 of the partial fluid duct 6 in such a manner, that its longitudinal axis is mainly perpendicular to the direction of the flow of the fluid in partial duct 7. At the axial level of the partial fluid duct 7 the piston 17 comprises a hole 17a extending over the whole radial diameter, which can be connected with the first duct section 7 in such a way, that the fluid flow in the partial fluid duct 6 is not obstructed, as is shown for both valve devices 3 and 4 in FIG. 11.

Furthermore the pistons 16 and 17 can take a position as is shown for the piston 17 of the valve device 4 in FIGS. 12 and 14. It is an effect of this arrangement, that in this position, which has been called the second position in the previous paragraphs, the fluid flow in the partial fluid duct 6 is interrupted.

Further to the previously described valve devices 3 and 4, the third embodiment of the control device shown in the FIGS. 9 to 14 still provides for each filtering device 1 and 2 an additional stop valve, as is shown in FIGS. 10 and 13. This stop valve is arranged at the bottom side of each zone 31 downstream from the first filter 13 of the filtering device 1 and the filtering device 2. In a closed position this stop valve 30 prevents, that a partial fluid stream flows off to the atmosphere. When however the stop valve 30 is opened, as is shown in FIG. 13 for the lower filtering device 1, then fluid can flow to the atmosphere through the stop valve 30 in its opened position and the draining duct 32, as is illustrated in FIG. 13 by the arrow 33.

The third embodiment of the control device shown in the FIGS. 9 to 14 is working in the following manner:

In the production position, as is shown in the FIGS. 9 to 11 and which has been called before the first position, the fluid to be filtered, for instance the thermoplastic synthetic material, passes the control device through the fluid supply duct 10 in the direction of the arrow 14. After passing the valve devices 3 and 4, the stop pistons (pins) 16 and 17 of which are in the first position, the fluid stream flowing in the direction of the arrow 14 is equally divided over both partial fluid ducts 5 and 6 and filtered there in both filtering devices 1 and 2. At this time the stop valves 30 (FIG. 10) are closed. After passing the filtering devices 1 and 2, the fluid, which is filtered by now, reaches through the fluid removal duct 11 for instance the die of an extruder. In this production position the stop pistons 16 and 17 of the valve devices 3 and 4 are in their first position, shown in FIG. 11, and do not block the flow of the fluid from the fluid supply duct 10 to fluid removal duct 11.

When it is observed, that a filter 13 of the filtering device 1 or 2 is covered with dirt particles and therefore a regeneration is needed, the stop piston 17 is moved from its first position shown in FIG. 11 to a position, which was called before the second position and which is illustrated by FIG. 14. In this second position, which can also be called the reverse washing position, there is still fluid passing through the fluid supply duct 10 in the direction of the arrow 14. This fluid passes the partial fluid duct 5 in the direction of the fluid removal duct 11 in such a way, that it passes the filtering device 2 and is filtered there. The partial fluid duct 6 is at this time blocked for the fluid by the position of the stop piston (pin) 17, as is illustrated in FIG. 14. Because the die of the extruder (not shown) downstream from the fluid removal duct 11 is building up a back pressure, there is now a partial stream of the fluid which is led from fluid removal duct 11 through the third duct section 9, the second duct section 8, the filtering device 2 in the direction of the closed stop piston 17 (FIG. 12). At this time however the stop valve of the filtering device 1 shown in FIG. 13 is opened, with the effect, that the particles washed from the screen surface of the filter 13 by the reversely flowing fluid are removed through the opened stop valve 30 and the draining duct 32 from the control device.

When it is required to perform the reverse washing in the filtering device 2, then this is done in an analogous manner. It is therefore necessary to bring the stop piston 16 (FIG. 9) in such a position, as is shown in the FIGS. 12 and 14 for the stop piston 17. At this time the stop piston 17 does not obstruct the flow of the fluid through the valve device 4. Furthermore the stop valve 30 of the filtering device 2 is opened, whereas the corresponding stop valve 30 of the filtering device 1 is closed.

The fourth embodiment of the control device, displayed in the FIGS. 15 to 18, corresponds with the second embodiment of the control device, as was illustrated above with the FIGS. 5 to 8, with the exception of the shape of the valve devices 3 and 4 and the draining ducts 40 and 41 connected with them. For that reason the explanation of the fourth embodiment will be restricted to the differences with respect to the second embodiment.

Different from the FIG. 5, the FIG. 15 shows a sectional view of the control device from above, showing in addition the hydraulic cylinders 42, which are required to turn the pistons (pins) 16 and 17 of the valve device 3 or 4 in the wanted manner.

The FIGS. 16 to 18 only show a view from the side, this side view displaying the first duct section 7 of the partial fluid duct 5, the valve device 3, the filtering device 1 and the second duct section 8 of the partial fluid duct 5.

The valve device 3 comprises a valve chamber, which valve chamber contains a cylindrical drilling hole to receive the cylindrical valve piston (pin) 16. This cylindrical valve piston 16 comprises a first hole 16a, extending over the whole radial diameter and being in such an axial level of the cylindrical valve piston, that the hole 16a can be brought in alignment with the partial fluid duct 5, as the FIG. 16 illustrates.

Additionally the cylindrical piston 16 comprises a gap 16b near its outer surface and at the same axial level as the hole 16a. By rotating the piston 16 this can be moved from its first position, shown in FIG. 16, to a position, in which the gap 16b is brought in alignment with the draining duct 40. This position is displayed by FIG. 18.

The cylindrical piston 16 can be turned into a further position, in which the fluid stream through the partial fluid duct 5 is blocked and in which the gap 16b is not yet in alignment with the draining duct 40. In this blocked position displayed in FIG. 17, the fluid stream is blocked in the direction of the arrow 14 as well in the reverse direction, since in the position according to FIG. 17 the gap 16b is not yet opened to the partial fluid duct downstream from the valve device 3 and not yet upstream to the filtering device 1.

In the first position of the cylindrical piston as is for instance shown for the cylindrical valve piston (pin) 16 in FIG. 16, the partial fluid stream is neither blocked by the valve device 3, nor by the valve device 4. At this time both filtering devices 1 and 2 are in operation. If one of the filtering devices 1 and 2 is to be subjected to reverse washing, the valve device 4 or 3, allocated to this filtering device 1 or 2, is brought into a position as has been shown for example in FIG. 18 for the valve device 3. At this time the other valve device is in its first position, as shown in FIG. 16. As a consequence of this the fluid stream through the partial fluid duct is not interrupted by the valve device to which the partial fluid duct is connected and a back pressure is built up before the extruder die of the extruder, leading to a reverse flow through the other partial fluid duct, which is blocked at this time. In this way the dirt particles on the filter 13 are detached and are removed to the atmosphere through the gap 16b and its connected draining duct, as has been explained extensively previously in connection with the second example.

The FIGS. 19 to 24 show the fifth and the sixth embodiment of the control device. The difference with the second embodiment described in FIGS. 5 to 8 is the shape of the valve devices 3 and 4 which are not piston-shaped blocking elements but rather disc-shaped blocking elements. Otherwise the fifth and the sixth embodiment correspond to the second embodiment.

FIG. 19 shows, how the fluid stream 14, which is to be filtered, is led through the fluid supply duct 10 to the two partial fluid ducts 5 and 6. The first duct section 7 of each of the partial fluid ducts contains a valve device 3 or 4. FIG. 19 displays the control device in a position (first position), which is used during production and which makes a filtration of both partial fluid streams possible. This can be achieved, by the arrangement of a filtering device 1 or 2 in each second duct section 8 of the partial fluid duct 5 or 6. Downstream from the filtering devices 1 and 2 the respective third duct sections 9 are united to form the fluid removal duct 11.

The fluid supply duct 10 forms an angle $\alpha$ of about 140° with the first duct section 7 of the partial fluid duct 3 and the first duct section 7 of the partial fluid duct 4, whereas the third duct section 9 forms an angle $\beta$ of about 130° with the fluid removal duct 11. The two second duct sections 8 of the two partial fluid ducts 5 and 6 are parallel.

The FIGS. 19 to 24 show, that each valve device 3 and 4 possesses a valve chamber 15, whereby inside the valve chamber 15 a disc-shaped blocking element 50 is provided in a rotating manner, so that it can be rotated. The disc-shaped blocking element 50 consists in the fifth embodiment of two shells 50a and 50b, as is shown in FIGS. 20 and 23. The sixth embodiment of the control device consists, instead of the two shells 50a and 50b, of a single disc-shaped blocking element 50, this single disc-shaped blocking element 50 being shown in the FIGS. 21 and 24.

The position of the disc-shaped blocking element 50 or 50a and 50b in the partial fluid ducts 5 or 6 is so, that its front sides are perpendicular to the flow direction of the fluid.

Each of the shells 50a and 50b of the disc-shaped blocking element comprises a hole 51 and 52 respectively, as is most clearly shown in the FIGS. 20 and 23. These holes 51 and 52 are arranged in such a way relative to each of the partial fluid ducts 5 and 6, that depending on the rotation of the disc-shaped blocking element 50 these holes 51 and 52 can be directed immediately to the partial fluid ducts 5 and 6. FIG. 19 shows, that the fluid can then flow freely in this partial fluid duct. The holes 51 and 52 (FIG. 20, FIG. 23) extend over the whole thickness of the disc-shaped blocking element 50.

Each shell 50a and 50b contains a further drill hole 53 or 54 adjacent to the hole 51 or 52, which further drill holes do not extend over the whole thickness of the disc-shaped blocking element and end in a draining duct 55 which runs outwardly along a radial and is open to the atmosphere. The drill holes 53 and 54 are in such a position, that they can be brought in alignment with the connected partial fluid duct by a rotating movement of the disc-shaped blocking element in the direction of the arrow 56 or the reverse direction. This is shown in the FIGS. 22 and 23 for the drilling hole 53. The axis of rotation of the disc-shaped blocking element is constituted by the piston (pin) 57.

Unlike the above the disc-shaped blocking element 50 in the FIGS. 21 and 24 is from one piece. Also now the disc-shaped blocking element 50 contains two holes 51, which are however in distinction to the above not shaped as cylindrical drill holes but as elliptical holes. Furthermore the disc-shaped blocking element 50 displayed in the FIG. 21 provides the gaps 53 and 54 discussed before in connection with the fifth embodiment as well as the draining ducts 55 in an identical way. 46

The disc-shaped blocking element 50 displayed in FIG. 21 can be rotated to a position as is shown in FIGS. 19 and 22.

The fifth and sixth embodiment of the control device are working in the following manner:

In the production position, shown in FIG. 19 and called before the first position, the fluid to be filtered, for instance the thermoplastic synthetic material, flows through the fluid supply duct 10 in the direction of the arrow 14 to the control device. Hereafter the fluid passes the valve devices 3 and 4, the common disc-shaped blocking element 50 or the shells 50a and 50b of which being in the first position, in which the holes 51 and 52 are in alignment with the partial ducts 5 and 6. Subsequently the fluid stream transported in the direction of the arrow 14 is filtered by the filtering devices 1 and 2 connected with the partial fluid ducts 5 and 6 respectively. After passing the filtering devices 1 and 2 the filtered fluid reaches through the fluid removal duct 11 for instance the die of an extruder. In this production position there is no interruption of the fluid stream from fluid supply duct 10 to fluid removal duct 11 by the disc-shaped blocking element 50 of the valve devices 3 and 4.

When it is observed, that a filter 13 of the filtering device 1 or 2 is covered with dirt particles and therefore a regeneration is required, the disc-shaped blocking element 50 is or the two shells 50a and 50b are moved from its or their first position (as shown in FIGS. 21 and 20 respectively) to a position, which was called before the second position and which is shown in FIGS. 24 and 23 respectively. In this second position, which can be called the position for the reverse washing, there is still fluid flowing through the fluid supply duct 10 in the direction of the arrow 14. This fluid flows through the partial fluid duct 5 in the direction of the fluid removal duct 11, whereby it passes the filtering device 1 and is filtered there. At the same time the partial fluid duct 6 is blocked for fluid supply by the position of the blocking element 50 or of the two shells 50a and 50b, as the FIGS. 23 and 24 display. Since the die of the extruder (not shown) downstream from the fluid removal duct 11 builds up a back pressure, a partial stream of the fluid flows from the fluid removal duct 11 through the third duct section 9, the second duct section 8 and the filtering device 2 to the blocking element 50 or 50a and 50b (FIG. 22). There it is led to the atmosphere through the gap 53, which does not extend over the whole axial diameter of the blocking element 50, and the duct 55. Since the fluid stream passes on its way outside the filter or the filters in a direction which is opposite to the direction for the filtration of the fluid (production position), the particles separated by the filter or the filters are detached and removed from the control device through the gap 53 and the draining duct 55, without a need to interrupt the production. After completion of the reverse washing the blocking elements 50 or 50a and 50b are again brought in a position, as is shown in the FIGS. 20 and 21.

If it is necessary to perform the reverse washing procedure at the other filtering device 1, this can be achieved in an analogous fashion. The partial fluid duct 6 is blocked and connected through the gap 54 and the draining duct 55 with the atmosphere, whereas the partial fluid duct 5 is not blocked.

The seventh embodiment of the control device shown in the FIGS. 25 to 30, comprises a fluid supply duct 10 which divides into a first partial fluid duct 5 and a second partial fluid duct 6. Both partial fluid ducts 5 and 6 end in a common fluid removal duct 11.

To each partial fluid duct 5 and 6 a filtering device 1 or 2 is allocated, whereby the filter 13 is perpendicular to the direction of the flow of the fluid as shown with the arrow 14.

This partial fluid duct 5 or 6 contains a first duct section 7, connected to it a second duct section 8 as well as a third duct section 9, whereby the first duct sections 7 form an angle α of about 140° with the fluid supply duct. The two second duct sections 8 of the two partial fluid ducts 5 and 6 are parallel, whereas the third duct sections 9 form an angle β of about 130° with the fluid removal duct 11.

Each first duct section 7 of the partial fluid ducts 5 and 6 is provided with a valve device 3 and 4 respectively.

As the FIGS. 25 and 26 display, each valve device 3 and 4 exists of a valve chamber 15 containing a cylindrical drill hole, said cylindrical drill hole comprising a cylindrical blocking element 16 or 17 provided within the valve chamber. The blocking elements 16 and 17 are arranged within the cylindrical valve chamber in a fluid-tight manner and can be shifted relative to the valve chamber 15 axially in the direction of the arrow 23 and in the reverse direction.

Each cylindrical blocking element 16 and 17 comprises a first hole 18, which extends over the whole diameter of the blocking element 16 and 17. At an axial distance from this hole each blocking element 16 and 17 comprises a second drilling hole 19 extending radially only over a part of the diameter. This second drilling hole 19 ends in a draining duct 20, which extends axially through the blocking element 16 and 17 and is open to the atmosphere.

In addition to the above-described drill holes the blocking element 17 possesses axially above the first hole 18 a second drill hole 21, which extends radially over only a part of the diameter of the blocking element 17 and ends in a connecting duct 22.

As was described before, the blocking elements 16 and 17 can be shifted within the drill hole of the housing in an axial manner in the direction of the arrow 23 and in the reverse direction.

The embodiment displayed in the FIGS. 25, 27 and 29 of the control device is like all described embodiments preferably used in connection with an extruder for thermoplastic synthetic material. For this purpose the control device is connected in such a way with the extruder or the pump for melted masses, that the control device is arranged downstream from the feed screw of the extruder or the pump for the melted masses and upstream from the extruder die, in the flow direction of the thermoplastic synthetic material. In this way the feed screw transports the thermoplastic synthetic material through the fluid supply duct 10 to the control device and the thermoplastic synthetic material is extruded by the extruder die positioned downstream from the fluid removal duct 11. Upon passing the control device the thermoplastic fluid synthetic material can be freed by the filter 13 of any unwanted particles.

The mode of action of the control device is described in more detail hereafter on the basis of the FIGS. 25 to 30 for its use in extruding thermoplastic fluid synthetic material.

The FIGS. 25 and 26 display an operating state of the control device as is present during the extrusion operation.

The fluid thermoplastic synthetic material flows through the fluid supply duct 10 to the control device, both blocking elements of the valve devices 3 and 4 being in a first position as shown in the FIGS. 25 and 26. In this first position the holes 18 provided in the blocking elements 16 and 17 are in alignment with the corresponding inner is diameter of the first duct sections 7 of the two partial fluid ducts 5 and 6. Consequently both partial fluid ducts are perfused in this first operating position with fluid synthetic material and the filters 13 can separate the unwanted particles from both partial fluid streams. After the combination of the partial fluid streams in the common fluid removal duct 11 the fluid synthetic material is transported to the extruder die (not shown) and shaped there as wanted.

As soon as the filter 13 is covered with particles and a regeneration (reverse washing) of a filter is necessary, a blocking element of the valve devices 3 or 4 is brought into a position as shown in the FIGS. 27 and 28 for the example of the valve device 4. In this second position of the valve device 4 the second drill hole of the blocking element 17 is then in alignment with the second duct section 8 of the second partial fluid duct, so that there is now a free way to the atmosphere through the drill hole 19 and the connected draining duct 20. Since the die of the extruder (not shown) builds up a back pressure in the system, the fluid synthetic material supplied through the first partial fluid duct 5 is led partly to the extruder die and partly led back through the third duct section 9 of the second partial fluid duct 6, leading to a reversal of the fluid flow direction in the second partial fluid duct 6. This reversal of the flow direction in the second partial fluid duct has the effect, that the filter 13 in the partial fluid duct 6 is freed from particles and the fluid synthetic material containing the particles is led to the atmosphere through the second and partly the first duct sections 8 and 7 , the second drill hole 19 and the draining duct 20. The whole procedure has the effect, that the filter 13 in the second partial fluid duct 6 is cleaned, without any interruption of the flow of the thermoplastic synthetic material to the extruder die.

After completion of the reverse washing of the filter 13 provided in the second partial fluid duct 6, the blocking element 17 is again moved to the position shown in FIG. 26. Subsequently the blocking element 16 is shifted axially to a position as shown in FIG. 28 for the blocking element 17 and the filter provided in the partial fluid duct 5 can be cleaned by the reverse washing procedure in an analogous way, as was described above for the filter 13 provided in the second partial fluid duct 6.

The FIGS. 29 and 30 display a third position of the blocking element of the valve devices 3 and 4. This third position represents a starting position which makes it possible, to lead a flow of synthetic material to the atmosphere from a position upstream from the control device in the flow direction of said synthetic material. In this third position the first valve device 3 is closed due to the axial shift of the blocking element 16 into the position as shown in FIG. 30. The blocking element 17 of the second valve device 4 is in a position, in which the fluid synthetic material can be led to the atmosphere through the third drill hole 21, the connecting duct 22 and the lateral fluid duct 12. In this position the fluid synthetic material does not flow through the filtering devices 1 or 2. In this way it can be avoided, that the filters are covered with a large amount of particles during the initial phase of the extrusion, leading to an immediate clogging of the filters.

The embodiment of the control device shown in the FIGS. 31 to 36 provides a construction in three parts. According to this embodiment the control device further consists of a connecting part marked 31' as a whole and a second part marked 32' as a whole. The three-section control device 31', 32' comprises a fluid supply duct 10, which divides to a first fluid duct marked 9 and a second fluid duct marked 8. The two fluid ducts 8 and 9 end in the corresponding partial ducts 5 and 6, which are contained in a filtering head marked as a whole as 33'. Each partial duct 5 and 6 of the filtering head 33' is connected with a filtering device 1 and 2 respectively, whereby the filter 13 is perpendicular to the direction of the flow of the fluid synthetic material according to the arrow 14.

The partial ducts 5 and 6 end downstream from the filtering devices 1 and 2 in a common fluid removal duct 11.

The first sections of the fluid ducts 8 and 9 form an angle α of 170° with the fluid supply duct 10. To each fluid duct a valve device 3 or 4 is provided in the zone of part 32'. The fluid ducts 8 and 9 are connected with the partial ducts 5 and 6 in such a way, that the ducts are in alignment with each other.

Part 32' furthermore contains a lateral fluid duct 12.

As the FIGS. 31 and 32 display, each valve device 3 and 4 contains a cylindrical drilling hole in the valve chamber 15, whereby the drill hole contains a cylindrical blocking element (shut-off device) 16 or 17 within the valve chamber. The blocking element 16 and 17 are arranged within the cylindrical drill hole of the housing in a fluid-tight way and can be shifted axially relative to the valve chamber in the direction of the arrow 23 and in the reverse direction.

Each cylindrical blocking element 16 and 17 comprises a first hole 18, which extends radially over the whole diameter of the blocking element 16 or 17. At an axial distance each blocking element 16 and 17 comprises a second drill hole 19 extending radially only over a part of the diameter. This second drill hole 19 ends in a draining duct 20, which extends axially through the blocking element 16 and 17 and is open to the atmosphere.

In addition to the above-described drilling holes the blocking element 17 possesses axially above the first hole a third drill hole 21, which extends radially over only a part of the diameter of the blocking element 17 and ends in a connecting duct 22.

As has been described before, the blocking elements 16 and 17 can be shifted axially within the boring in the housing in the direction of the arrow 23 and in the reverse direction.

In order to attach the three-section control device 31' or 32' to an existent filtering head 33', mounting surfaces are provided in the filtering head by a gap in the shape of a prism. This gap in the shape of a prism corresponds in dimension and shape to the prism-shaped connecting section 31'. Hereafter the prism-shaped connecting section 31' is mounted fluid-tight on the filtering head 33' in such a way, that the fluid duct sections 9 and 8 within the connecting section 31 are in alignment with the partial duct sections 5 and 6 of the filtering head. If necessary, the connecting sections between the respective ducts are treated mechanically. Now the section 32' of the control device, comprising the valve devices 3 and 4, is connected fluid-tight to the corresponding mounting surfaces of the connecting section 31', whereby the connecting section 31' is is taken off the filtering 33' in order to be able to check in a simple manner the alignment of the fluid ducts 8 and 9 in the connecting zone of the sections 31' and 32'. After the position of the fluid ducts with the partial ducts in both connecting zones (connecting section with filtering head and connecting section with section 32') is checked and if necessary the wanted alignment is established by mechanical treatment, the sections 33', 31' and 32' are connected with one another, preferably by a screw connection which can be disconnected.

The filtering head 33' provided with the sections 31' and 32' is now connected on one side with the fluid supply duct 10 and on the other side with the fluid removal duct 11 of an extruder in such a way, that the feed screw is arranged upstream from the fluid supply duct 10 and downstream from fluid removal duct 11 the die of the extruder, viewed in the flow direction 14 of the fluid synthetic material.

The fluid synthetic material passes the control device consisting of the sections 32' and 31' and the filtering head 33' in the direction of the arrow 14 and is freed from any unwanted particles by the filter 13.

The operation of the control device is explained in more detail hereafter for three operational modes using the FIGS. 31 to 36.

The FIGS. 31 and 32 display an operating state present during the running extrusion process.

The fluid thermoplastic synthetic material is led through the fluid supply duct 10 in the flow direction 14 to the control device. The valve devices 3 and 4 provide a first position of the blocking elements 16 and 17, as is displayed in the FIGS. 31 and 32. In this first position the hole 18 in the blocking elements 16 and 17 is in alignment with the corresponding inner diameter of the fluid ducts 8 and 9. For this reason, in this first operational mode fluid synthetic material flows through both fluid ducts 8 and 9 as well as the connected partial fluid ducts 5 and 6. In this position the filters 13 separate the unwanted particles from both streams of synthetic material. After combination of the streams of synthetic material in the common fluid removal duct 11 the now cleaned fluid synthetic material is led to the extruder die (not shown) and shaped there as wanted.

As soon as the filters 13 are covered with particles and a regeneration (reverse washing) of a filter is necessary, one of the valve devices 3 or 4 is brought into a position as shown in the FIGS. 33 and 34 for the example of the valve device 4. In this second position of the valve device 4 the second drill hole of the blocking element 17 is then in alignment with the fluid duct section 8a of the lower duct section 8, so that there is now a free way to the atmosphere through the drill hole 19 and the connected draining duct 20. Since the extruder die of the extruder (not shown) builds up a back pressure in the system, the fluid synthetic material supplied through the first partial fluid duct 9 and the partial fluid duct 5 is led partly to the extruder die and partly led back to the valve device 4 through the partial fluid duct 5 and the connected fluid duct section 8a, with the effect, that the direction of the flow of the synthetic material in this lower partial duct 6 and the connected fluid duct section 8a is reversed. This reversal of the flow direction in the lower partial duct 6 and 8a has the effect, that the filter 13 in the partial duct 6 is freed from particles and the fluid synthetic material containing the particles is led to the atmosphere through the second drill hole 19 and the draining duct 20. The whole procedure has the effect, that the filter 13 in the second partial fluid duct 6 is cleaned (reverse washing), without any interruption of the flow of the fluid synthetic material to the extruder die and therefore of the extrusion process itself.

After the reverse washing of the filter 13 in the second partial duct 6, the blocking element 17 is again brought in a position as shown in FIG. 32. Next the blocking element 16 is shifted axially to the position shown for blocking element 17 in FIG. 34. The filter 13 in partial duct 5 can now be cleaned in analogous manner as was described above for the filter 13 in partial duct 6.

The FIGS. 35 and 36 represent a third position of the blocking elements 16 and 17 of the valve devices 3 and 4. This third position represents a starting position which makes it possible, to lead a flow of synthetic material to the atmosphere upstream before the control device in the flow direction 14 of said synthetic material. In this third position the first valve device 3 is closed due to the axial shift of the blocking element 16 into the position as shown in FIG. 36. The blocking element 17 of the second valve device 4 is in a position, in which the fluid synthetic material can be led to the atmosphere through the third drill hole 21, the connecting duct 22 and the lateral fluid duct 12. In this position the fluid synthetic material does not flow through the filtering devices 1 or 2. In this way it can be avoided, that the filters 13 are covered with a large amount of particles during the initial phase of the extrusion, which would lead to an immediate clogging of the filters 13.

In the previous text and in particular in the concrete examples repeatedly an extruder die of an extruder was mentioned. It is clear that other equipment, which can usually be used in the processing of thermoplastic synthetic material, is covered as well.

We claim:

1. A control device for filtering at least two partial fluid streams, comprising:
    a common fluid supply duct for supplying said fluid streams;
    a common fluid removal duct for removing the filtered fluid streams;
    at least two partial fluid ducts, positioned between the common fluid supply and removal ducts, each of said at least two partial fluid ducts including;
        a corresponding filtering device in each partial fluid duct for filtering a respective partial fluid stream in the corresponding partial fluid duct,
        a single corresponding valve device for each of said partial fluid ducts for controlling the flow of the respective partial fluid stream in each of said partial fluid ducts via a corresponding blocking element, wherein the number of valve devices is equal to the number of said partial fluid ducts, each said blocking element being located in the flow of the respective partial fluid stream of the corresponding partial fluid duct and having a first open position for directing said respective partial fluid stream to flow through the corresponding filtering device, a second blocking position for blocking said respective partial fluid stream from said corresponding filtering device and for redirecting said respective partial fluid stream to one of the at least one other partial fluid ducts for filtering in its corresponding filtering device, while the filtering device in said corresponding partial duct is washed of accumulated particles by a reversed flow of said partial fluid stream through said filtering device, and a third position for directing said respective partial fluid stream outside said control device, and
        a corresponding stop valve positioned in proximity to each said corresponding filtering device, having a first open position and a second blocking position, each said stop valve being in said first open position, when the corresponding blocking element is in its second blocking position, for releasing said particles washed from the corresponding filtering device from said device, and each said stop valve being in said second blocking position when said corresponding blocking element is in its first open position.

2. The control device according to claim 1, wherein each said blocking element can be moved from said first position to said second position and reversely by one of rotating and shifting said blocking element.

3. The control device according to claim 1, wherein each said blocking element has a cylindrical shape, the cylindrical blocking elements being positioned substantially perpendicularly to the flow direction of the respective partial fluid stream in the corresponding partial fluid ducts, wherein each said cylindrical blocking element comprises a hole which can be brought into alignment with said corresponding partial fluid duct in said first open position, and wherein said first open position and said second blocking position can be selected by rotating said cylindrical blocking element.

4. The control device according to claim 3, wherein each said cylindrical blocking element further comprises a gap, at the same axial level as said hole, which can be brought into alignment with a draining opening when moved to said third position.

5. The control device according to claim 4, wherein said draining opening has the shape of a draining duct.

6. The control device according to claim 1, wherein each said blocking element can be moved from said first, second and third positions by one of rotating and shifting said blocking element.

7. The control device according to claim 1, wherein each said blocking element has a disc-shape, the front surfaces of the disc-shaped blocking element being substantially perpendicular to the direction of the flow of the respective partial fluid stream in the corresponding partial fluid duct, wherein each said disc-shaped blocking element comprises at least one first hole which can be brought into alignment with said corresponding partial fluid duct in said first open position, and wherein said first open position and said second blocking position can be selected by rotating said disc-shaped blocking element.

8. The control device according to claim 7, wherein each said disc-shaped blocking element has a third position that can be selected by rotating said disc-shaped blocking element.

9. The control device according to claim 8, wherein each said disc-shaped blocking element comprises a gap that is in alignment with a draining opening when said blocking element is in said third position.

10. The control device according to claim 9, wherein said draining opening has the shape of a draining duct.

11. The control device according to claim 10, wherein said draining duct extends radially through said disc-shaped blocking element.

12. The control device according to claim 7, wherein each said disc-shaped blocking element comprises curved and straight edges.

13. The control device according to claim 1, wherein each said stop valve is positioned upstream from each said filter device.

14. The control device according to claim 13, wherein each said stop valve (30) is further positioned at the inlet opening of a draining duct.

15. The control device according to claim 1, wherein each said stop valve is positioned downstream from each said filter device, such that each said filter device is washed by said partial fluid stream when each said stop valve is in its first open position.

16. The control device according to claim 15, wherein each said filter device is rotatable.

17. The control device according to claim 15, wherein each said stop valve is allocated to the each said filter device in such a way, that it selectively blocks the corresponding partial fluid duct downstream from each said filter device.

18. The control device according to claim 1, further comprising a plurality of mounting elements for securing said control device in a position downstream from one of a feed screw of an extruder for synthetic material and a pump for melted masses, and in a position upstream from an extruder die.

19. The control device according to claim 1, wherein said control device comprises two partial fluid ducts each comprising a first duct section forming an angle α in the range of approximately 120° to 160° with said fluid supply duct, wherein said first duct section is followed in the fluid flow direction by a substantially parallel second duct section, and wherein said second duct section is followed in the fluid flow direction by a third duct section between said second duct section and said fluid removal duct, said third duct forming an angle β in the range of approximately 120° to 140° with said fluid removal duct.

20. The control device according to claim 19, wherein each said corresponding valve device is positioned in a respective said first duct section.

21. The control device according to claim 19, wherein each said corresponding filtering device is positioned in a respective said second duct section.

22. The control device according to claim 1, wherein each said second and third positions of each said blocking element constitute said blocking element being aligned at an identical angle relative to alignment of said fluid supply duct.

23. The control device according to claim 1, wherein each said valve device comprises a housing having at least one cylindrical drill hole and at least one respective cylindrical blocking element, wherein each said at least one cylindrical blocking element is arranged with a bearing that enables said at least one cylindrical blocking element to axially move around said at least one cylindrical drill hole, wherein each said at least one cylindrical drill hole is provided with two radially opposite drill holes, each with access to a respective one of said at least two partial fluid ducts and wherein each said at least one cylindrical blocking element comprises a first drill hole radially running through the diameter of said blocking element and a second hole, arranged at an axial distance from said first drill hole, extending over part of said diameter, and wherein each said second drill hole is coupled with a draining duct extending axially through each said blocking element.

24. The control device according to claim 23, wherein each said blocking element comprises a third drill hole radially extending over part of said diameter, said third drill hole coupled to a second draining duct axially extending through each said blocking element.

25. The control device according to claim 23, wherein each said second and third drill holes each comprises an elliptical cross-section.

26. The control device according to claim 23, wherein the diameters of said second and third drill holes and said draining duct taper, respectively.

27. The control device according to claim 1, wherein each said valve device can be selectably disconnected from the respective partial fluid duct.

28. The control device according to claim 27, wherein each said control device further comprises a connecting section and a filtering head, wherein each said connecting section comprises said at least two partial fluid ducts and said filtering head comprises said corresponding filtering devices.

29. A control device for filtering at least two partial fluid streams, comprising:

a common fluid supply duct for supplying said fluid streams;

a common fluid removal duct being connected with said fluid removal duct for removing the filtered fluid streams; and at least two partial fluid ducts, positioned between the common fluid supply and removal ducts, each of said at least two partial fluid ducts including;

a corresponding rotatable filtering device for filtering a respective partial fluid stream, a corresponding valve device for controlling the flow of the respective partial fluid stream via a corresponding blocking element, each said blocking element being located in the flow of the respective partial fluid stream of the corresponding partial fluid duct and having a first open position for directing said respective partial fluid stream to flow through the corresponding filtering device, and a second blocking position for blocking said respective partial fluid stream from said corresponding filtering device and for redirecting said respective partial fluid stream to one of the at least one other partial fluid ducts for filtering in its corresponding filtering device, while the filtering device in said corresponding partial duct is washed of accumulated particles by a reversed flow of said partial fluid through said filtering device, and a corresponding stop valve, positioned downstream from said corresponding filtering device, having a first open position and a second blocking position, said stop valve being in said first open position, when the corresponding blocking element is in its second blocking position, for releasing said particles washed from the corresponding filtering device from said device, and said stop valve being in said second blocking position when said corresponding blocking element is in its first open position.

* * * * *